United States Patent
Matthews et al.

(10) Patent No.: US 10,093,434 B2
(45) Date of Patent: Oct. 9, 2018

(54) METHODS FOR TREATING AIRCRAFT STRUCTURES

(71) Applicant: ROSEBANK ENGINEERING PTY LTD, Bayswater, Victoria (AU)

(72) Inventors: Neil Matthews, Selby (AU); Rhys Jones, Blackburn South (AU)

(73) Assignee: Rosebank Engineering PTY LTD, Bayswater, Victoria (AU)

( * ) Notice: Subject to any disclaimer, the term of this patent is extended or adjusted under 35 U.S.C. 154(b) by 894 days.

(21) Appl. No.: 14/387,790

(22) PCT Filed: Mar. 25, 2013

(86) PCT No.: PCT/AU2013/000309
§ 371 (c)(1),
(2) Date: Sep. 24, 2014

(87) PCT Pub. No.: WO2013/142902
PCT Pub. Date: Oct. 3, 2013

(65) Prior Publication Data
US 2015/0063903 A1 Mar. 5, 2015

Related U.S. Application Data

(60) Provisional application No. 61/617,213, filed on Mar. 29, 2012.

(51) Int. Cl.
*B64F 5/00* (2017.01)
*C23C 22/73* (2006.01)
(Continued)

(52) U.S. Cl.
CPC .................. *B64F 5/00* (2013.01); *B05D 1/02* (2013.01); *B05D 1/06* (2013.01); *B05D 1/10* (2013.01);
(Continued)

(58) Field of Classification Search
CPC .. B64C 1/06; B64C 1/12; B64C 1/061; B64C 1/064; B64C 1/065; B64C 1/10; B64C 1/068; B64C 1/069; B23P 6/00; B23P 6/04; B64F 5/0081; B64F 5/40; B64F 5/00; C23C 24/04; C23C 24/02; C23C 24/00; C23C 22/73; B32B 37/24; B32B 5/16;
(Continued)

(56) References Cited

U.S. PATENT DOCUMENTS

2008/0047222 A1 2/2008 Barnes
2009/0130327 A1 5/2009 Erdmanm et al.
2016/0340060 A1* 11/2016 Matthews ............. B64F 5/0081

OTHER PUBLICATIONS

International Search Report dated May 23, 2013 for corresponding International Patent No. PCT/AU2013/000309 filed Mar. 25, 2013.
(Continued)

*Primary Examiner* — Michael E. La Villa
(74) *Attorney, Agent, or Firm* — David D. Brush; Westman, Champlin & Koehler, PA

(57) ABSTRACT

The present invention relates to methods for repairing a structural weakness in an aircraft fuselage, or preventing the advancement of a structural weakness in an aircraft fuselage. Cold spray methods such as supersonic particle deposition have been shown to positively affect structural characteristics of sheet metal and lap joints as used in fuselage construction.

12 Claims, 17 Drawing Sheets

(51) Int. Cl.
| | |
|---|---|
| C23C 24/04 | (2006.01) |
| B22F 7/08 | (2006.01) |
| B05D 1/06 | (2006.01) |
| F16B 19/04 | (2006.01) |
| C23C 24/00 | (2006.01) |
| B05D 1/02 | (2006.01) |
| C23C 24/02 | (2006.01) |
| F16B 5/04 | (2006.01) |
| B05D 1/10 | (2006.01) |
| B22F 7/00 | (2006.01) |
| B05D 1/12 | (2006.01) |
| B05D 7/04 | (2006.01) |
| B64C 1/06 | (2006.01) |
| B64C 1/10 | (2006.01) |
| B64C 1/12 | (2006.01) |
| B05D 7/14 | (2006.01) |
| B23P 6/04 | (2006.01) |
| B23P 6/00 | (2006.01) |
| B64F 5/40 | (2017.01) |

(52) U.S. Cl.
CPC ............... *B05D 1/12* (2013.01); *B05D 7/04* (2013.01); *B05D 7/14* (2013.01); *B22F 7/00* (2013.01); *B22F 7/08* (2013.01); *B23P 6/00* (2013.01); *B23P 6/04* (2013.01); *B64C 1/06* (2013.01); *B64C 1/061* (2013.01); *B64C 1/064* (2013.01); *B64C 1/065* (2013.01); *B64C 1/068* (2013.01); *B64C 1/069* (2013.01); *B64C 1/10* (2013.01); *B64C 1/12* (2013.01); *B64F 5/40* (2017.01); *C23C 22/73* (2013.01); *C23C 24/00* (2013.01); *C23C 24/02* (2013.01); *C23C 24/04* (2013.01); *F16B 5/04* (2013.01); *F16B 19/04* (2013.01); *Y10T 403/472* (2015.01)

(58) Field of Classification Search
CPC ..... B32B 15/02; B32B 15/016; B32B 15/017; Y10T 403/472; Y10T 403/47; F16B 5/04; F16B 19/04; B22F 7/00; B22F 7/08; B05D 1/06; B05D 1/02; B05D 1/10; B05D 1/12; B05D 7/14; B05D 7/04; B05D 2202/25

See application file for complete search history.

(56) References Cited

OTHER PUBLICATIONS

Written Opinion dated May 23, 2013 for corresponding International Patent No. PCT/AU2013/000309 filed Mar. 25, 2013.
Extended European Search Report dated Nov. 9, 2012 for corresponding European Patent Application 12162261.7 filed Mar. 29, 2012.
R. Jones et al, 2011, "On the use of supersonic particle deposition to restore the structural integrity of damaged aircraft structures" International Journal of Fatigue, 33 (2011) 1257-1267.
Champagne et al., "The Effect of Cold Spray Impact Velocity on Deposit Hardness", Modelling and Simuation in Materials Science and Engineering, Modelling Simul. Mater. Sci. Eng. 18 (2010) 065011 (8pp), Aug. 5, 2010.
Kah et al., "Investigation of Weld Defects in Friction-Stir Welding and Fusion Welding of Aluminum Alloys", International Journal of Mechanical and Materials Engineering (2015) 10:26).

* cited by examiner

METHODS FOR TREATING AIRCRAFT STRUCTURES

CROSS-REFERENCE TO RELATED APPLICATIONS

This Application is a Section 371 National Stage Application of International Application No. PCT/AU2013/000309, filed Mar. 25, 2013, published as WO 2013/142902 A2 on Oct. 3, 2013, in English, which is based on and claims the benefit of U.S. Provisional Patent Application No. 61/617,213, filed Mar. 29, 2012; the contents of which are hereby incorporated by reference in their entireties.

FIELD OF THE INVENTION

The present invention relates to the field of aircraft manufacture and repair; and also to preventative maintenance of aircraft. In particular, the invention relates to the prevention and repair of structural weaknesses and environmental degradation in aircraft fuselages and other structures.

BACKGROUND TO THE INVENTION

The fuselages of many aircraft consist of circumferential frame members, longitudinal stringers, and a thin skin, all made from lightweight aluminium. This construction allows for a balance of flight properties and weight.

The sheets of aluminium that make up the skin are connected together as lap joints by generally two to three rows of rivets. The outer skin later is countersunk at each rivet location so the rivet head is flush with the skin, resulting in optimal aerodynamic properties.

When the skin is subjected to the stresses of normal operation, particularly in pressurized commercial aircraft, fatigue damage can occur in the metal sheets and especially in high stress locations around fasteners. The problem is exacerbated by the ingress of environmental elements and leads to the joint cracking. Crack growth, if left undetected, can lead to catastrophic failure, as in the case of Aloha Airlines Flight 243 in 1988. As the aircraft reached its normal flight altitude of 24,000 feet (7,300 m), a small section on the left side of the roof ruptured. The resulting explosive decompression tore off a large section of the roof, consisting of the entire top half of the aircraft skin extending from just behind the cockpit to the fore-wing area. It was subsequently discovered that the incident was caused by the presence of multiple small cracks which arose as a result of environmental degradation of the joint located aft of the front port side passenger door. This phenomenon has subsequently been termed "multi-site damage" (MSD).

Since the Aloha incident, aircraft operators have been directed to regularly check for the presence of cracks and MSD in the fuselage skin. In order to identify the presence of cracks before they reach critical lengths, various inspection techniques are utilized.

While visual inspection is an important part of the detection process, however many naturally occurring cracks in their initiation are simply too small to see or otherwise detect. To assist with the detection of these small and hidden cracks, non-destructive inspection (NDI) methods are used. NDI methods can also be used to detect cracks that exist under paint and detect areas of corrosion between the layers of skin. Some of the more common NDI methods used in aircraft fuselage crack detection are ultrasound and eddy current methods. These methods are not capable of detecting all cracks and are particularly poor in detecting small naturally occurring defects.

After the Aloha Airlines Flight 243 accident, all 737's with over 50,000 cycles we required to have their lap joints reinforced with external sheet metal patches. This modification is costly, and takes about 15,000 man hours.

The Alohoa accident further highlighted the problem of multiple interacting repairs. Despite the presence of MSD in the fuselage lap joint the failure in that incident ran from corrosion repair to corrosion repair. Indeed, for Boeing 727 aircraft [42, 43] there are numerous instances where no crack growth was noted until after a corrosion repair had been installed.

The problem of multiple interacting repairs to corrosion damage is not confined to corrosion in fuselage lap joints. The common approach to corrosion damage in operational aircraft is to cut out the corrosion and rivet a mechanical doubler over the region. Unfortunately if the aircraft is operated in an aggressive environment then corrosion is likely to occur over a (relatively) broad area and this can lead to a number of mechanical repairs that lie in relatively close proximity. This repair process involves drilling holes, which act as stress concentrators, in the base structure and unless the operational environment changes these holes provide sites at which corrosion pits can develop and subsequently crack as was seen in the Aloha accident.

As such a repair methodology is needed whereby the structure need not be further damaged and new sites at which pitting and subsequent cracking are created.

As another example, in April 2011 a fuselage lap joint in a Southwest Airlines Boeing 737-300 aircraft tore an 18 inch hole in the roof, and led to the grounding of 79 of its older Boeing 737 aircraft for inspections [38, 39]. This resulted in the cancelation of almost 700 flights [38, 39]. These inspections, which found cracks in a total of four Southwest aircraft, [38] led to the US FAA mandating the inspection of 175 737 aircraft that had experienced more than 35,000 cycles. There are more than 931 similar aircraft worldwide. The problem is not confined to 737 and 727 aircraft. On 26th October 2010 an American Airlines 757-200 aircraft was forced to land at Miami International Airport due to a sudden decompression arising from cracking in a fuselage joint. This aircraft had experienced less than 23,000 cycles. This led to the discovery of cracking in other 757 aircraft and a January 2011 FAA Airworthiness directive [40] mandating the inspection of all 757-200 and 757-300 aircraft.

Environmental degradation and subsequent crack initiation and progression is not just of importance to commercial airlines. Military aircraft, particularly those with advanced age, can also develop environmental degradation and cracking at fastener holes. As the military attempts to keep its fleet flight-worthy for longer periods of time, additional prevention, inspection, and mitigation methods are being developed to prevent both environmental degradation and catastrophic failure.

When cracks are discovered, they are typically repaired by the application of external sheet metal patches. Again, this is a costly and time consuming process. A further problem is that the application of patches may actually initiate a weakness in the underlying structure. Such undetected and undetectable cracks can compromise the safety of the fuselage/wing skin. These repairs can also locally over-stiffen the structure and result in catastrophic failure in the fuselage/wing skin as a result of a crack running from repair to repair.

Externally bonded composite bonded repairs have been developed to address this problem. However, these repairs do not prevent the ingress of moisture and hence do not alleviate environmental degradation of the structure. Furthermore, to ensure a durable bond the structure needs to be heated to approximately 120 C. Additionally, composite bonded repairs cannot be used in regions where there is a tight radius of curvature.

It is an aspect of the present invention to overcome or alleviate a problem of the prior art by providing a method for preventing or repairing a structural weakness in an aircraft structure. A further aspect of the present invention is to overcome or alleviate a problem of the prior art by providing a method for preventing environmental degradation in an aircraft structure.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each provisional claim of this application.

SUMMARY OF THE INVENTION

In a first aspect the present invention provides a method for (i) repairing a structural weakness, and/or (ii) preventing or inhibiting the initiation of a structural weakness, and/or (iii) preventing or inhibiting the progression of a structural weakness in an aircraft structure and/or (iv) preventing the ingress of an environmental element, the method comprising the step of bonding a plurality of particles to the structure, the bonding being effected under conditions allowing the plurality of metallic particles to form a substantially continuous layer.

In one embodiment the method is for (i) repairing a structural weakness, and/or (ii) preventing or inhibiting the initiation of a structural weakness, and/or (iii) preventing or inhibiting the progression of a structural weakness in an aircraft structure and (iv) preventing the ingress of an environmental element.

In a second aspect the present invention provides an aircraft structure comprising a substantially continuous metallic layer, the layer being deposited on a surface of the structure, the layer being capable of (i) repairing a structural weakness, or (ii) preventing or inhibiting the initiation of a structural weakness, or (iii) preventing or inhibiting the progression of a structural weakness in the aircraft structure, wherein the layer comprises a plurality of metallic particles.

In one embodiment, the layer is capable of (i) repairing a structural weakness, and/or (ii) preventing or inhibiting the initiation of a structural weakness, and/or (iii) preventing or inhibiting the progression of a structural weakness in an aircraft structure and (iv) preventing the ingress of an environmental element.

In one embodiment of the structure the substantially continuous layer is deposited on the surface of the aircraft structure by a method as described herein.

In one embodiment of the method or structure, at least a proportion, or substantially all, of the particles are metallic particles.

In one embodiment of the method or structure, the bonding does not involve melting or fusing of the particles.

In one embodiment of the method or structure, the bonding is achieved by a cold spray process, such as supersonic particle deposition.

In one embodiment of the method or structure, the substantially continuous layer is at least about 0.05 mm.

In one embodiment of the method or structure, the substantially continuous layer has substantially even depth across the application surface.

In one embodiment of the method or structure, the aircraft structure is a fuselage component, such as a sheet metal, and may be a lap joint. Where the structure is a lap joint the substantially continuous layer does not extend to cover a junction between the free end of a sheet metal component of the lap joint.

In one embodiment, the structural weakness is a crack.

DETAILED DESCRIPTION OF THE INVENTION

Figure 1:
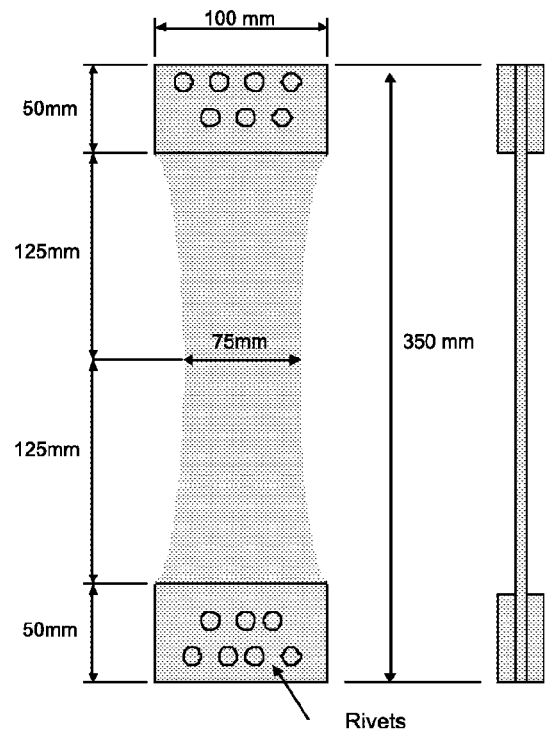
FIG. 1 is a diagram showing the geometry of an edge notched panel, being a 2024T3 test specimen. Material is: Aluminium Alloy 2024T3 AlClad 350 mm×100 mm×1.27 mm (0.050").

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and from different embodiments, as would be understood by those in the art.

For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the claims below and the description herein, any one of the terms "comprising", "comprised of" or "which comprises" is an open term that means including at least the elements/features that follow, but not excluding others. Thus, the term comprising, when used in the claims, should not be interpreted as being limitative to the means or elements or steps listed thereafter. For example, the scope of the expression a method comprising step A and step B should not be limited to methods consisting only of methods A and B. Any one of the terms "including" or "which includes" or "that includes" as used herein is also an open term that also means including at least the elements/features that follow the term, but not excluding others. Thus, "including" is synonymous with and means "comprising".

In a first aspect the present invention provides a method for (i) repairing a structural weakness, and/or (ii) preventing or inhibiting the initiation of a structural weakness, and/or (iii) preventing or inhibiting the progression of a structural weakness in an aircraft structure, and/or (iv) preventing or inhibiting the ingress of an environmental element, the method comprising the step of bonding a plurality of particles to the structure, the bonding being effected under conditions allowing the plurality of particles to form a substantially continuous layer.

In some embodiments of the structure, the method is for (in addition to any one or all of the applications (i), (ii) and (iii) recited supra), (iv) preventing or inhibiting the ingress of an environmental element. Embodiments having all of the applications (i) to (iv) are particularly advantageous given the significant advantages provided in terms of extended life of the aircraft structures. Accordingly, a preferred form of the method provides that the method is for (i) repairing a structural weakness, and/or (ii) preventing or inhibiting the initiation of a structural weakness, and/or (iii) preventing or inhibiting the progression of a structural weakness in an aircraft structure and (iv) preventing the ingress of an environmental element.

Applicant has discovered that the deposition of a substantially continuous layer of particles over an area of structural weakness (or potential structural weakness) has a positive effect on the present or future structural integrity of the aircraft structure. It has also been shown that the layer is capable of sealing a substrate against the ingress of environmental elements, which in turn may lead to the development of a structural weakness. The deposition of a substantially continuous layer has been shown to seal joints, including mechanical repairs against the ingress of environmental elements such as water, salts, air, acidified rain and the like. Thus, in some embodiments application of the substantially continuous layer has a preventative as well as restorative result.

As used herein, the term "repair" is not intended to be construed narrowly to mean that the structure must be returned precisely to its original state. It is contemplated that in some embodiments, the structure may be returned to a proportion of its original structural strength, or indeed or a multiple of its original strength.

The term "prevent" is not intended to be limited to circumstances where the initiation of a structural weakness is completely prevented. The initiation of the weakness may be delayed in time, or it may manifest as a less severe weakness at initiation.

The term "inhibit" is not intended to mean that progression of the structural weakness is completely inhibited. It may just mean that the progression is delayed, or that it progresses to an otherwise less severe weakness.

The term "structural weakness" is intended to mean any weakness in the structure (or in any part of the structure where the structure is multi-partite) that alters the ability of the structure to remain integral upon the application of a force. In the context of the present invention a structural weakness includes a crack, a split, a bend, a deformation, a tear, or damage occasioned by exposure to an environmental element on an aircraft structure in the course of service. It does not include any weakness deliberately inflicted on a structure, nor is the term intended to include any alteration in the geometry of a structure such as may be occasioned on a gearbox component, or an engine component, for example.

While the step of bonding may involve the melting and/or fusing of the particles (such as that involved in high velocity or low velocity oxygen fuel thermal spray coatings), preferred embodiments of the method do not involve melting or fusing of the particles. In one embodiment of the method, the step of bonding the plurality of particles is accomplished by bonding directly to the substrate (and also to each other) by the release of kinetic energy from the particles. The particles may acquire the kinetic energy by any means, but the energy is typically acquired by accelerating the particles to a high velocity toward the substrate. Upon impact with the substrate, the particles deform (typically flattening) and form a consolidated structure up to several centimeters thick.

Impact of the particles with a solid surface at sufficient velocity causes plastic deformation and bonding with the underlying material without the creation of heat affected zones which are typical of other deposition processes and which are undesirable in many structural applications. Bonding is a result of high strain rate deformation and adiabatic shear instabilities and the bond interface. Specific advantages of this technology include but are not limited to the following a. SPD produces an excellent bond with the substrate
b. SPD can be used to create almost any required thickness.
c. SPD produces coatings with very few defects Reusable for reclamation of eroded surfaces and application of wear resistant coating. (SPD enables the continuing reuse of the base material).
d. Can be applied to recover damaged geometry without adversely affecting the substrate (no distortion, heat affected zones or embrittlement).
e. The method can be used to enhance structural integrity through localized strengthening which may reduce the initiation of cracks or propagation of cracks.
f. SPD can be used to seal a joint and a riveted repair against the ingress of environmental elements thereby alleviating the environmental degradation of the structure.
g. Significant reduction in occupational health and safety risks associated with a number of current in-service applied coatings (e.g. cadmium and hexavalent-chromium-containing compounds)

Such embodiments of the method are operative at temperatures below the melting point of the particle used in the method. In some embodiments, the method is operative at a temperature of less than 90%, 80%, 70%, 60%, 50%, 40%, 30%, 20%, 10%, 9%, 8%, 7%, 6%, 5%, 4%, 3%, 2% or 1% of the melting point of the particle.

One particularly useful method for bonding particles (and particularly metallic particles) to the aircraft structure is a cold spray method. Cold spray methods are known in the art, and are characterized by the application of particles to a substrate at temperatures below the melting point of the particles. As used herein, the term "cold spray" is intended to include any coating process utilizing a high-speed gas jet to accelerate a plurality of particles toward a substrate whereby the particles consolidate on impact. In many cases, the process is conducted at a temperature that is substantially lower than the particle melting point.

The term 'cold spray' has been used to describe this process due to the relatively low temperatures of the expanded gas stream that exits the spray nozzle. After exiting the nozzle, the particles are impacted onto a substrate, where the solid particles deform and create a bond with the substrate. As the process continues, particles continue to impact and form bonds with the previously consolidated material resulting in a uniform deposit with very little porosity and high bond strength.

Since bonding of the powder to the substrate, as well as the cohesion of the deposited material, is accomplished in the solid state at low temperatures, the characteristics of the cold sprayed material is advantageous in the context of the present invention. Because particle oxidation as well as deleterious tensile stresses that occur during thermal contraction are minimized, the cold spray process has the ability to produce materials with comparatively superior bond strength to the substrate and greater cohesive strength.

The Examples herein demonstrate that fatigue performances of cracked metallic structures having a cold spray applied metallic layer under constant amplitude loading are significantly improved over untreated structures. The experimental data demonstrates that the baseline specimens accrued damage more rapidly and that crack growth was significantly greater than the corresponding treated panels. In the majority of tests cases the SPD-treated panels showed little evidence of damage/crack growth. A prediction of the fatigue performance of a treated single edge notch coupon was made using SIF values calculated via an approximate analysis and the resultant crack length history is in agreement with experimental data. Weight function solutions for repairs to centre cracked panels have also been developed and validated via three dimensional finite element analysis.

In some embodiments of the method the substantially continuous layer is formed by exposing the structure to a high velocity (typically between 300 and 1200 m/s) stream of solid-phase particles, which have been accelerated by a supersonic gas flow, typically nitrogen or helium, at a temperature that can range between about 400 and 900° C.

Cold spray processes are known by alternative names including supersonic particle Deposition (SPD); dynamic spray high velocity powder deposition, kinetic spraying, and Kinetic Energy Metallization.

The present invention is a significant departure from the accepted uses of cold spray technology. Previously, the method has been used as a coating, much like paint, or to restore geometries in worn parts. The use of the process to result in an aircraft structures having improved structural characteristics is an advance in the art, providing economic and safety advantages.

In one embodiment, the cold spray process is a low pressure cold spray process comprising injecting the plurality of particles in the diverging section of the spray nozzle from a low-pressure gas supply.

In low-pressure cold spray, air or nitrogen at relatively low pressure—80-140 psi—is also preheated, up to 550° C., then forced through a DeLaval nozzle. At the diverging side of the nozzle, the heated gas is accelerated to about 600 m/s. Powder feedstock is introduced downstream in the diverging section and accelerated toward the substrate. As the applicability of cold spray technology expands to new and unique areas of application, there has been an increasing number of commercially available, ready-to-use cold spray systems introduced into the marketplace.

In high-pressure cold spray, helium or nitrogen at high pressure, up to 1,000 psi, is preheated—up to 1,000° C.—and then forced through a converging-diverging DeLaval nozzle. At the nozzle, the expansion of the gas produces the conversion of enthalpy into kinetic energy, which accelerates the gas flow to supersonic regime—1,000 m/s—while reducing its temperature. The powder feedstock is introduced axially into the gas stream, prior to the nozzle throat. The accelerated solid particles impact the substrate with enough kinetic energy to induce mechanical and/or metallurgical bonding.

The skilled artisan appreciates that both high pressure and low pressure cold spray processes may be operable in the context of the present invention.

Of greater relevance than the pressure per se is the velocity at which the particles are propelled toward the substrate. Pressure is one parameter that will influence velocity, however other factors such as particle size and particle weight will have an effect. Typically, the process is operated such that the particles are propelled at or exceeding a minimum velocity that is sufficient to provide adhesion of particles, and/or provide an acceptable porosity in the resultant coating, and/or provide an acceptable deposition efficiency.

However, the velocity should not be so high as to damage the substrate, or result in the deflection of significant amounts of particle off the substrate or the building particulate layer.

Preferred velocities for a given application vary according to the powder type. For some powders a low pressure unit will generate a sufficient velocity to achieve the required adhesion, porosity or deposition efficiency. For aluminium powder (which is a preferred species of particle in the present methods) a low pressure system may achieve the desired outcome if operated at its upper limits. However, it is more typical for a high pressure unit to be used in the present methods.

The skilled artisan is enabled to adapt a cold spray method to be operable in the context of the present methods. For example, where a particular hardness is required in the consolidated metal layer relatively simple particle impact models as applied to empirical models for flow stress and hardness may result in useful predications of the hardness resulting from a cold spray metallic powder deposition. In particular, reference is made to the modelling of Champagne et al (*Modelling Simul. Mater. Sci. Eng.* 18 (2010) 065011 (8 pp)). These authors show that strain hardening of cold sprayed deposits is a result of the flattening of the particles as they impact and bond with the surface. Particle impact velocity is the principle controlled parameter of the cold spray process, where particle velocity and material properties determine particle flattening.

A constitutive model often used for high strain rate deformation is that of Johnson and Cook [5]. This model includes strain hardening, strain rate hardening and thermal softening effects during deformation.

A number of variables may be routinely manipulated to achieve a desired outcome for a particular application. While not all variables must necessarily be considered to achieve a desired outcome, some of which may be considered include the following non-limiting parameters:
a. Substrate material
  i. Type
  ii. Condition
  iii. Surface Finish
b. Powder
  i. Material Type
  ii. Material Condition
  iii. Size
  iv. Shape
c. Application Nozzle
  i. Material Type
  ii. Nozzle Shape
d. Carrier Gas
  i. Type
e. Deposition Parameters
  i. Gas input pressure
  ii. Gas expansion temperature
  iii. Deposition flow rates
  iv. Deposition transition rates The particles may compromise a single species of particle, or multiple species. The plurality of particles may be metallic particles, polymer particles or composite particles. For aircraft-related application the particles are typically metallic particles fabricated from any elementary or alloyed metal, including (but not limited to) aluminium, zinc, tin, copper, nickel, titanium, tantalum, cobalt, iron, niobium, molybdenum, and tungsten. Preferably the metallic particles are aluminium particles. The particles are typically utilized in the form of a commercially available powder, generally ranging in size from about 5 to about 100 μm.

The choice of particle is within the ability of the skilled artisan. Generally, the particle is composed of the same material as the substrate.

In one embodiment of the method, the substantially continuous layer is substantially dense and/or substantially impervious to a liquid, including water, any polar solvent or any nonpolar solvent. An advantage of such layers is that weather is excluded from any underlying surface that would normally be prone to corrosion, this enhancing the operation life of the aircraft.

The method may be conducted such that a substantially continuous layer of particles of any depth is created. The skilled artisan will be capable of assessing a minimum required depth for any given structural result required. For example, where the structural weakness is minor or the aircraft structure is not a critical component, a lesser depth may be implemented. Conversely, a greater depth may be indicated where the structure has significant damage, or where the structure has minor damage but is expected to be exposed to high levels of stress during operation.

In some embodiments, the method is adapted to deposit a substantially continuous layer having a depth of at least about 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm. 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.5 mm, 6.0 mm, 6.5 mm, 7.0 mm, 7.5 mm, 8.0 mm, 8.5 mm, 9.0 mm, 9.5 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm. Preferably, the substantially continuous layer has a depth of at least about 0.05 mm. At this depth, a layer deposited by SPD may be capable of achieving one of (i) repairing a structural weakness, (ii) preventing or inhibiting the initiation of a structural weakness, (iii) preventing or inhibiting the progression of a structural weakness in an aircraft structure and (iv) preventing the ingress of an environmental element the aims. For typical applications in aircraft, the substantially continuous layer has a depth of from about 0.2 mm to about 4 mm. Depths of at least about 0.2 mm have greater utility in structural aspects of the invention.

In some embodiments, the method is adapted to deposit a substantially continuous layer having a depth of at most about 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm. 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.5 mm, 6.0 mm, 6.5 mm, 7.0 mm, 7.5 mm, 8.0 mm, 8.5 mm, 9.0 mm, 9.5 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, or 30 mm.

It will be understood that depth of the layer may be adjusted by building up layers of particles in the course of the method. In some embodiments, the substantially continuous layer has substantially even depth across the application surface.

In one embodiment of the method, the aircraft structure comprises a single part. The component may be any part of an aircraft for which structural integrity is important, such as a fuselage component. In a preferred embodiment of the method the component is a sheet metal forming the "skin" of the fuselage; an engine cowling, or a flight control such as a wing (including a flap, aileron, spoiler or winglet), tail (including a rudder, elevator or stabilizer), Sheet metal components are thin, relatively flexible and are particularly prone to fatigue and cracking. The cold spray application of aluminium particles to the sheet metal can increase the life of the part, and also repair any structural weakness before it leads to a catastrophic structural failure.

In one embodiment, the aircraft structure has two or more components. The present methods have been found to be particularly advantageous for the treatment of lap joints, and particularly riveted lap joints. Typically, such joints comprise an upper skin which overlaps an inner skin, with the overlapping area being secured by rows of fasteners, such as rivets. Often, three rows of rivets are provided across the overlapping area.

In one embodiment the aircraft structure is a joint. The joint may comprises one or more fastener holes, such as those found in a lap joint. In that case, the method comprises the step of bonding a plurality of particles on, over or about the one or more fastener holes, the bonding being effected under conditions allowing the plurality of particles to form a substantially continuous layer In some embodiments, the fastener holes include a fastener. In that case the method comprises the step of bonding a plurality of particles on, over or about the one or more fasteners, the bonding being effected under conditions allowing the plurality of particles to form a substantially continuous layer.

Applicant proposes that for structural joints (such as lap joints) and also riveted repairs, environmental elements are capable of entering the skin splice or joint during service. This leads to degradative effects between the two mating surfaces and also around fasteners. In the case of fuselage lap joints the load in the upper skin is transmitted to the lower skin through the rivets. These rivets have countersunk heads resulting in what is termed "knife edges" in the upper skin. The aggressive environment coupled with the high stresses at these knife edges results in crack initiation. It is this crack initiation (which is exacerbated by environmental degradation) that results in crack growth at the fuselage joint.

Applicant further proposes that by both sealing the fasteners and reducing stresses in the upper skin, the problem of corrosion initiated cracking at fuselage joints is ameliorated or overcome. In addition the life of the joints is also increased. This may be achieved by the supersonic particle deposition (SPD) of a substantially continuous layer over the riveted region lap joint, riveted repairs, and other structural joints in thin skinned aircraft structure.

Figure 23A:
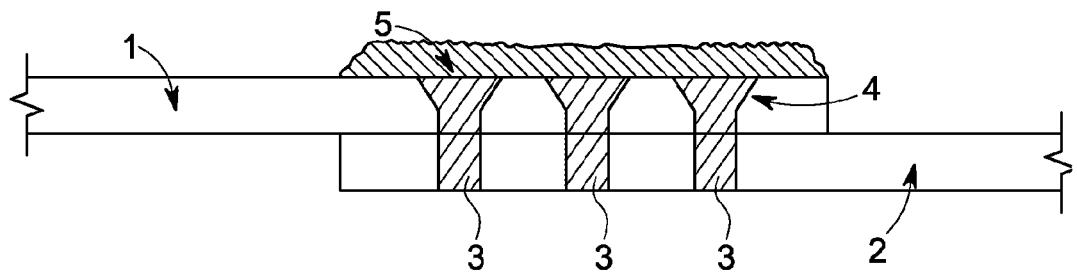
FIG. 23A is a cross-sectional view of a lap joint having an SPD doubler.

Turning now to FIG. 23A there is shown diagrammatically and in cross-section a lap joint comprised of an upper sheet metal component 1, a lower sheet metal component 2, a rivet hole 4 passing through components 1 and 2, with a rivet 3. An SPD layer 5 has been applied such that the metal particles are bonded to the sheet metal component 1, the rivet 3, and an upper region of the rivet hole 4. It will be noted that edges of the layer 5 are bevelled, and that the layer 5 does not extend to cover the junction between the free end of sheet metal component 1 and the underlying second sheet metal component 2.

Figure 23B:
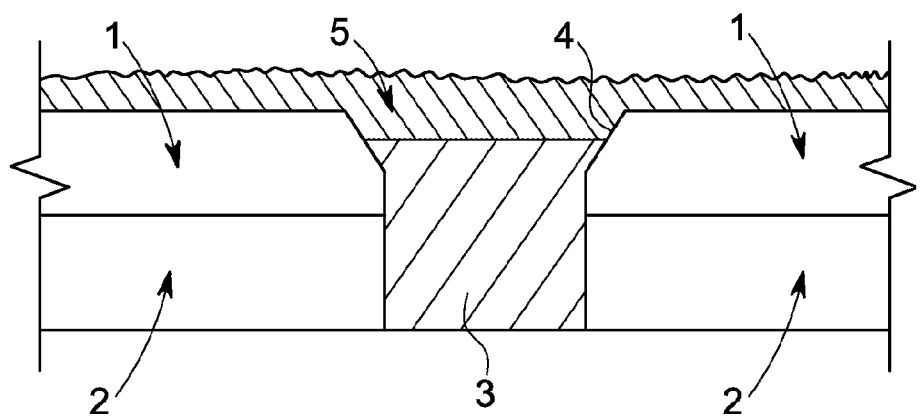
FIG. 23B is an enlarged cross-sectional view of the lap joint of FIG. 24A, showing a single rivet.

FIG. 23B shows an enlarged view of the lap joint of FIG. 23, better showing the countersinking of the rivet 3 within the joint.

Figure 23C:
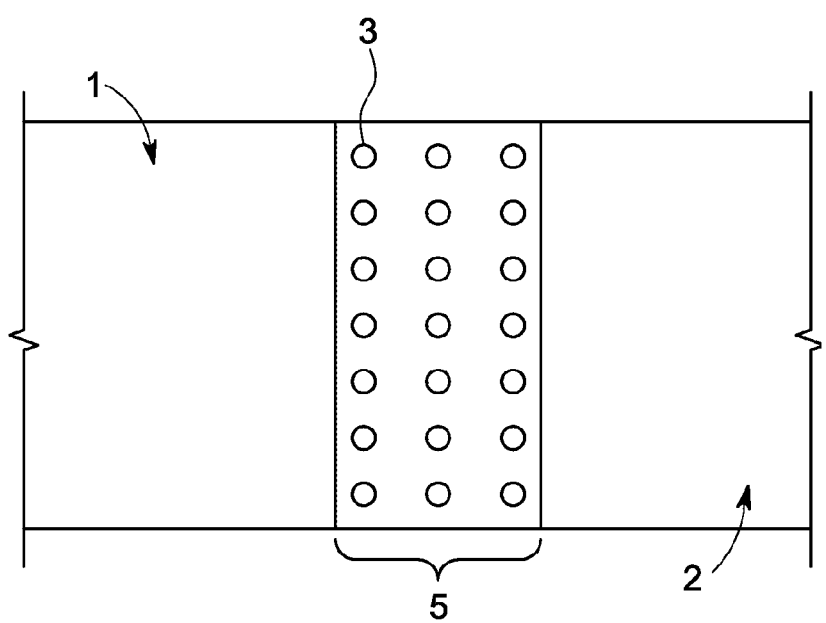
FIG. 23C is a plan view of the lap joints shown in FIGS. 23A and 23B.

A plan view of the lap joint is shown in FIG. 23C showing the three rows of rivets. The overlying SPD layer covers the area defined by 5. The edge of the application area 5 coincides with the edge of the upper sheet metal component 1 such that the SPD layer does not extend onto underlying sheet metal component 2, nor does the deposited material enter the interface between sheet metal components 1 and 2.

In one embodiment of the invention the structural weakness is a crack. Preferably the crack is initiated at the periphery of an aperture in the aircraft structure. Preferably the aperture is a fastener hole. Preferably the fastener hold is a faster hole adapted to receive a faster having a countersunk head. In one embodiment the crack is one formed by a force exerted by the fastener against an edge of a fastener hole. The initiation of the crack may be due to normal fatigue, and may aggravated by the presence of damage as a result of environmental ingress to the location In another aspect the present invention provides an aircraft structure comprising a substantially continuous layer, the layer being deposited on a surface of the structure, the layer being capable of (i) repairing a structural weakness, and/or (ii) preventing or inhibiting the initiation of a structural weakness, and/or (iii) preventing or inhibiting the progression of a structural weakness in the aircraft structure, and/or (iv) preventing the ingress of an environmental element, wherein the layer comprises a plurality of particles.

In some embodiments of the structure, the layer is capable (in addition to any one or all of the capabilities (i), (ii) and (iii) recited supra) of (iv) preventing or inhibiting the ingress of an environmental element. Embodiments having all of the capabilities (i) to (iv) are particularly advantageous with regards to the operable life of an aircraft structure. Accordingly, a preferred form of the method provides that the layer is capable of (i) repairing a structural weakness, and/or (ii) preventing or inhibiting the initiation of a structural weakness, and/or (iii) preventing or inhibiting the progression of a structural weakness in an aircraft structure and (iv) preventing the ingress of an environmental element.

In some embodiments, the substantially continuous layer has a depth of at least about 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm. 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.5 mm, 6.0 mm, 6.5 mm, 7.0 mm, 7.5 mm, 8.0 mm, 8.5 mm, 9.0 mm, 9.5 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, or 30 mm.

In some embodiments, the substantially continuous layer has a depth of at most about 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm. 2.0 mm, 2.1 mm, 2.2 mm, 2.3 mm, 2.4 mm, 2.5 mm, 2.6 mm, 2.7 mm, 2.8 mm, 2.9 mm, 3.0 mm, 3.1 mm, 3.2 mm, 3.3 mm, 3.4 mm, 3.5 mm, 3.6 mm, 3.7 mm, 3.8 mm, 3.9 mm, 4.0 mm, 4.1 mm, 4.2 mm, 4.3 mm, 4.4 mm, 4.5 mm, 4.6 mm, 4.7 mm, 4.8 mm, 4.9 mm, 5.0 mm, 5.5 mm, 6.0 mm, 6.5 mm, 7.0 mm, 7.5 mm, 8.0 mm, 8.5 mm, 9.0 mm, 9.5 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, or 30 mm.

In some embodiments, the substantially continuous layer has substantially even depth across the application surface.

In one embodiment, the aircraft structure is a single component, such as a sheet metal. In one embodiment, the aircraft structure has two or more components, such as a lap joint.

In one embodiment, the substantially continuous layer is formed by a method as described herein.

In one embodiment, the aircraft structure is a joint comprising a first component, and a second component, the first and second components each having an aperture, the first and second components jointed by a fastener extending through the apertures, a substantially continuous layer over or about at least one of the apertures.

Preferably, the substantially continuous layer does not extend to cover a junction between the free end of a first sheet metal component of the lap joint and the face of a second sheet metal component of the joint. This form of the joint is preferred because the SPD doubler does not transfer any load between the upper and lower skin. If the joint were modified in this way, a substantial amount of validation work would be necessary to fully characterise the structural properties of the modified joint.

The present invention will now be more fully described by reference to the following non-limiting examples.

Figure 2:
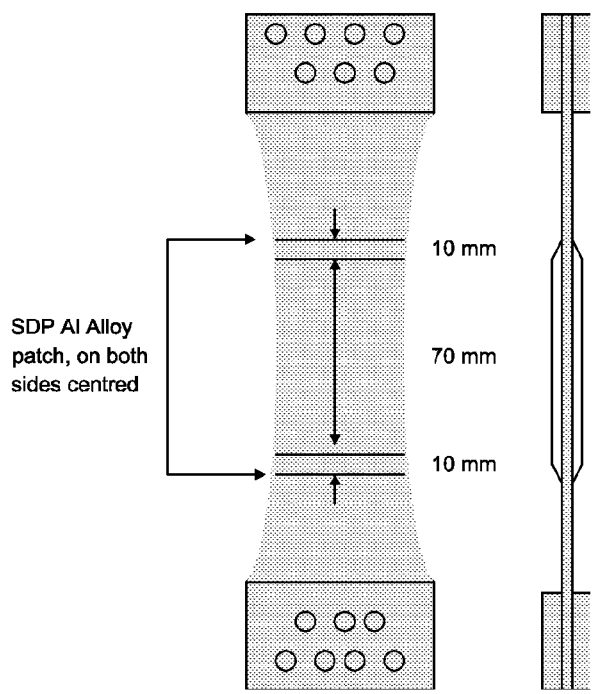
FIG. 2 is a diagram showing the geometry of the panel of FIG. 1 with an SPD doubler.
Figure 3:
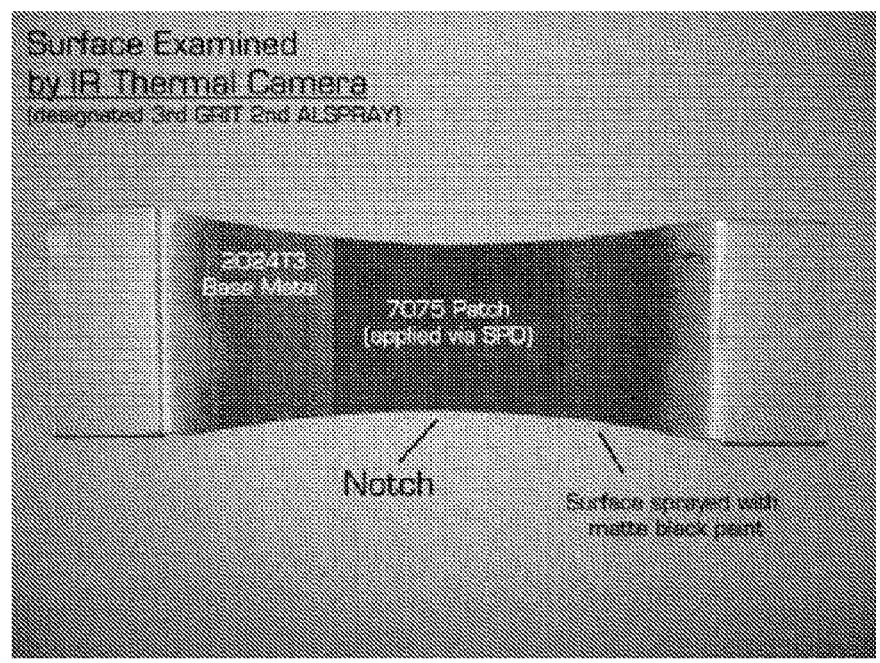
FIG. 3 is a photograph in plan view of a test panel being 2024T3 with SPD doubler.

Example 1: Effect of SPD on the Fatigue Performance of Cracked Metallic Structures To study the effect of a supersonic particle deposition (SPD) on the fatigue performance of cracked metallic structures initial tests were performed on a 350 mm long and 1.27 mm thick 2024-T3 clad aluminium alloy dogbone specimen which contained a centrally located 2 mm long edge notch, see FIGS. 1-3. These initial tests were performed under constant amplitude loading with $\sigma_{max}$=181 MPa and R=$\sigma_{min}/\sigma_{max}$=0.1. (This stress level was chosen since it represents a realistically upper bound on stresses that can be expected in a thin wing skin.) Two specimens were tested, one without a deposited metallic layer (also known as a "SPD doubler"), and one with a 1 mm thick full width doubler, that extended over the working section of the specimen, deposited on either side of the specimen, see FIGS. 2 and 3. The doublers were deposited using a 7075 Aluminium Alloy powder with a nominal particle size of between 30 and 40 μm The following deposition parameters were utilized:
Elapsed Time Between Surface Preparation And Coating: 15-20 mins
Main Gas Pressure (Bar): 40
P/F Vessel Pressure (Bar): 38
Temperature (° C.): 400
P/F Hopper Heater: Active
Main Gas Flow (m3/hr): 92-100
P/F Gas Quantity (m3/h): 6.5
Powder Feed Rate (RPM): 2.7 rpm RELEASE TEMP (° C.): 300
Preheat Temp (° C.): 350
Increment (mm): −0.25 mm
Traverse Rate (mm/s): 250 mm/s
Stand Off (mm): 40 mm (where possible)
Number Of Layers: 12-16 Passes per Patch
Deposition Thickness: 0.005-0.012"
Post Treatment: None For the baseline specimen test the crack length was monitored using digital cameras. However, whilst there are numerous non-destructive inspection tools that are commonly used to monitor crack growth in aircraft structures, i.e. ultrasonics, eddy currents, thermography, etc., the present study used Lock-in infra-red thermography to simultaneously monitor the evolution of the stress and the damage states in the 2024-T3 skin and the SPD doublers. (At this point it should be noted that to ensure a uniform emissivity the surface being monitored was sprayed matt black and that thermography was used as a qualitative rather a quantitative measure of the stresses and the fatigue damage.

Figure 4:
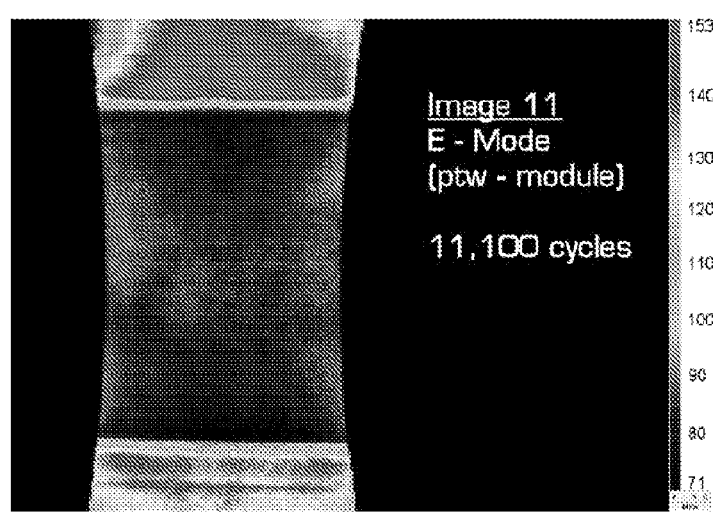
FIG. 4 is an IR thermal image showing the stresses is an SPD doubler at 11,100 cycles (units in MPa).
Figure 5:
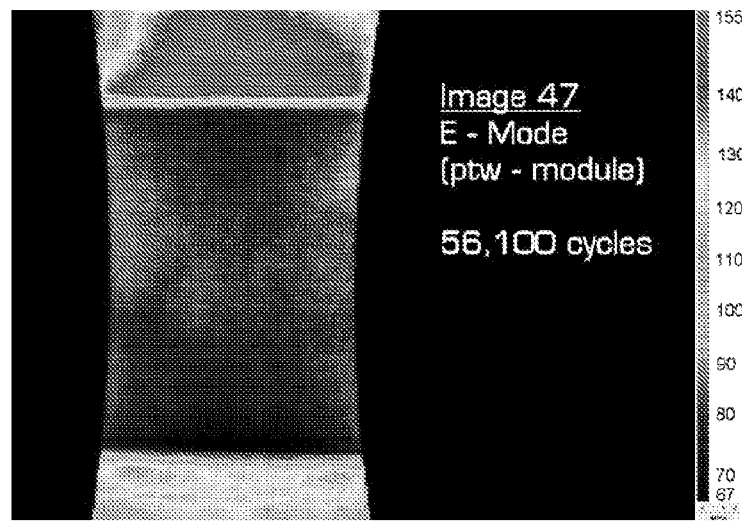
FIG. 5 is an IR thermal image showing the stresses is an SPD doubler at 56,100 cycles (units in MPa).

Details on the use of lock-in thermography to measure surface stresses and energy dissipation are given in [13-15].) The baseline specimen, i.e. without a doubler, lasted approximately 35,000 cycles. In contrast the 7075 SPD patched panel test was stopped after approximately 60,000 cycles with little, i.e. no evident, damage in the 7075 SPD or crack growth in the 2024-T3 skin. FIGS. 4 and 5 present infrared pictures of the stress field at 11,100 and 56,100 cycles respectively. These figures show that the stresses in the SPD doubler remained essentially unchanged throughout the test.

Example 2: Single Edge Notch Tension (SENT) SPD Strip Tests

Figure 6:
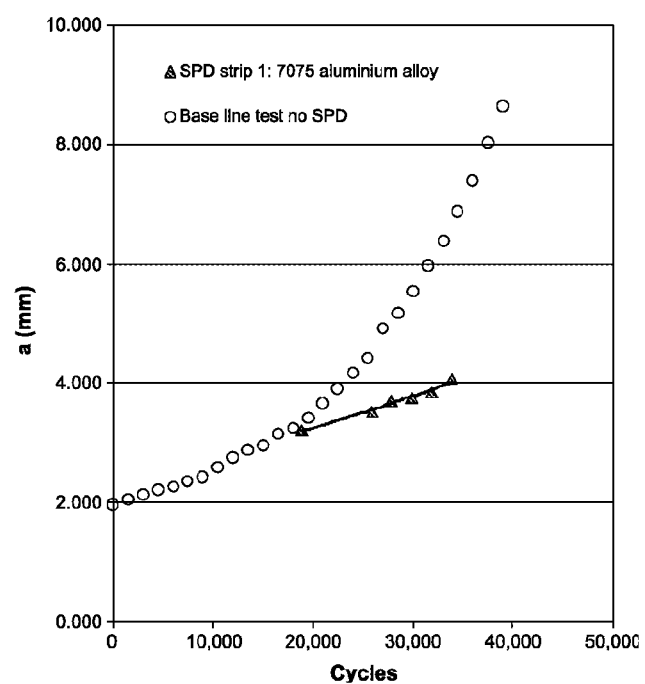
FIG. 6 is a graph showing crack growth histories in SENT tests.

To further study the ability of SPD doublers to reduce crack growth tests were performed on a single edge notch dogbone specimen, with a geometry as described above and an (initial) 1.4 mm long edge notch. In the initial base line test there was no SPD and the specimen was tested under constant amplitude loading with a peak stress in the working section of $\sigma_{max}$=93.36 MPa and R ($\sigma_{min}/\sigma_{max}$)=0.1. This stress level was chosen to represent a typical fuselage skin stress. Crack growth in the 2024-T3 plate was monitored using digital cameras and the resultant crack length versus cycles history is shown in FIG. 6.

Figure 7:
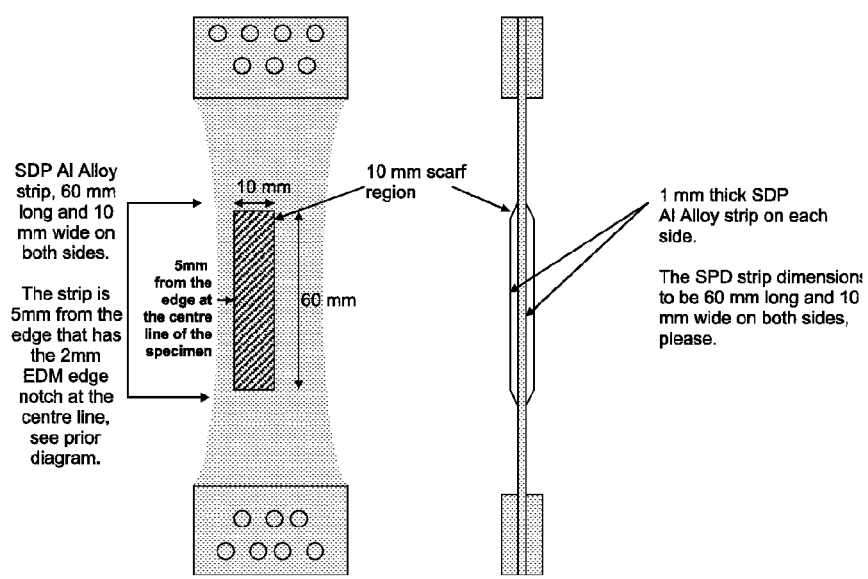
FIG. 7 is a diagram showing the location of an SPD strip repair on a 2024T3 test specimen.
Figure 8:
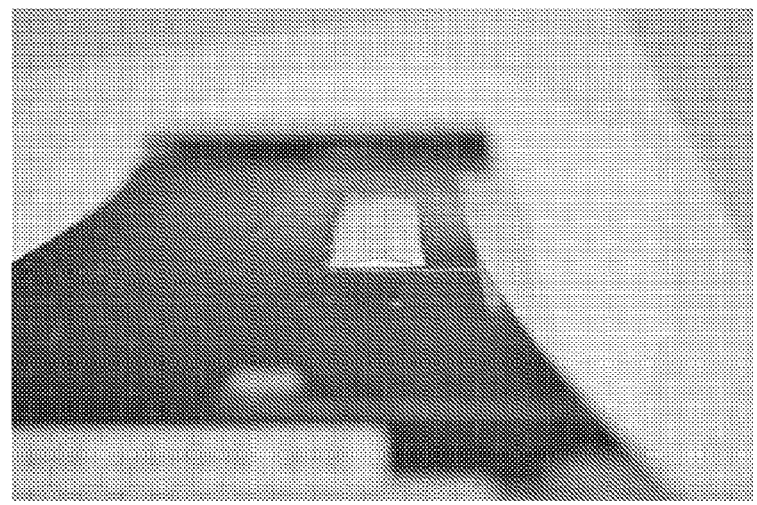
FIG. 8 is a photograph showing cross-section of an SPD strip.

In the next test, the specimen was first loaded so as to grow a sharp crack. This first phase of the test was stopped at 18,886 cycles when the crack length was approximately 3.2 mm. A 10 mm wide and 1 mm thick SPD strip with a nominally (isosceles) triangular crossection, see FIGS. 7 and 8, was then installed and the test was continued. The Crack growth in the 2024-T3 plate was again monitored using digital cameras whilst the stress field in both the SPD strip and the 2024-T3 skin and the degradation in the SPD strip was monitored using Lock-in infrared thermography.

Figure 9:
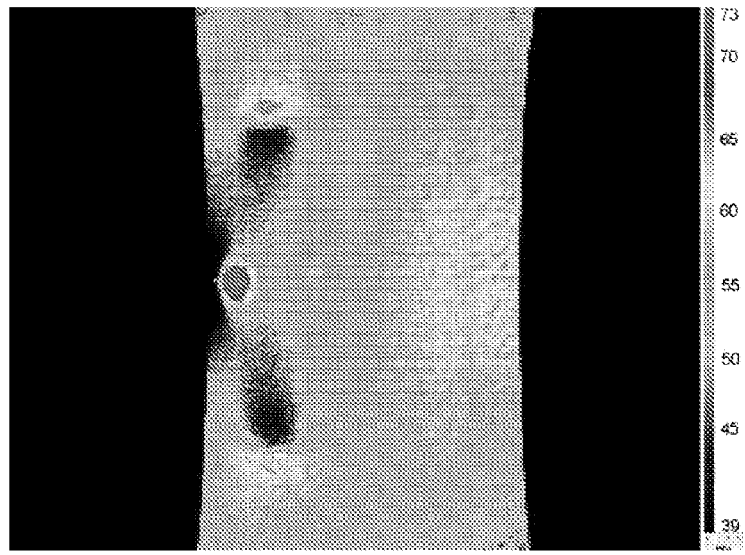
FIG. 9 is an IR thermal image showing the stress field in the skin and the SPD strip (units in MPa).

An infrared stress image captured shortly after the restart of the test is shown in FIG. 9. In this figure the picture was captured at a cyclic stress amplitude $\Delta\sigma$, remote from the centre line of the specimen, of approximately 53 MPa. This was done so as to not overly influence crack growth in the skin. Here it can be seen how the stress field in the SPD ahead of the crack is contiguous with that in the plate, i.e. the SPD is taking load in the region ahead of the crack.

Hot spots were also noted in the skin outboard of the ends of the SPD strip which establish that the SPD strip was indeed pulling load from the skin. This is essential if the process is to enhance the damage tolerance of the skin. The resultant crack growth data is shown in FIG. 6 where it is seen that the use of a 7075 aluminium alloy SPD strip has significantly reduced the crack growth rate.

A second test was then performed whereby the SPD strip was applied to a 0.3 mm long initial edm (electrical discharge machine) crack (notch) where the crack was not sharpened (grown) prior to installation of the SPD strip. In this case the test was stopped after approximately 345,000 cycles since there was no apparent crack growth at the notch (crack) or damage in the SPD.

Example 3: Cracking in 7050-T7451 SENT Tests

It is well known that for combat aircraft most of the fatigue life of the structure is consumed in the growth of short cracks [16]. Consequently to evaluate the effect of a SPD repair on small flaws in aircraft structural components a 3 mm thick SENT (single edge notch tension) dogbone specimen, was tested with a $K_t$=1.11, with a thin 0.5 mm thick 7075 aluminium alloy SPD patch on one side. The 7050-T7451 specimen was 350 mm long, 42 mm wide and 3 mm thick and had a 0.69 mm radius semi-circular edge notch on one side. The specimen was tested at a peak stress, in the working section, of 140.0 MPa with R=0.1. This corresponds to a peak (remote) load of 17.64 kN with R=0.1 and was chosen to represent the stress, at limit load, in the wing skin of a typical fighter aircraft.

Figure 10:
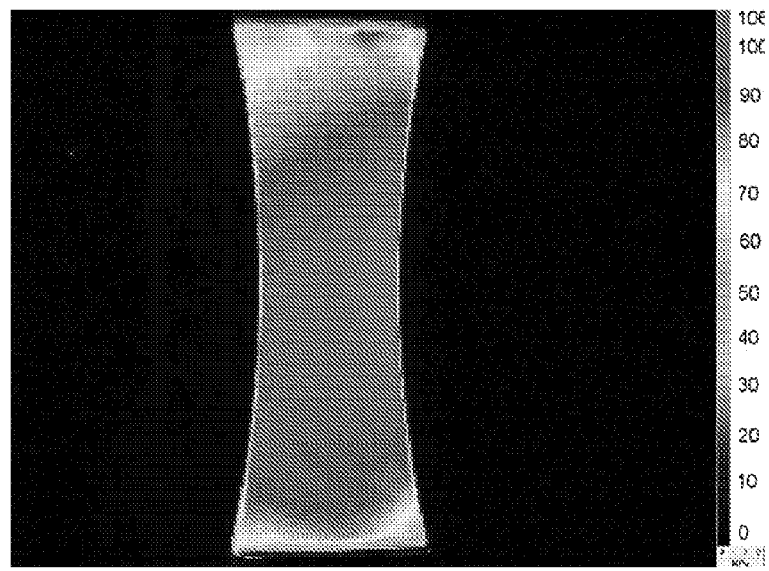
FIG. 10 is an IR thermal image showing stresses in an SPD at 3000 cycles (units in MPa).
Figure 11:
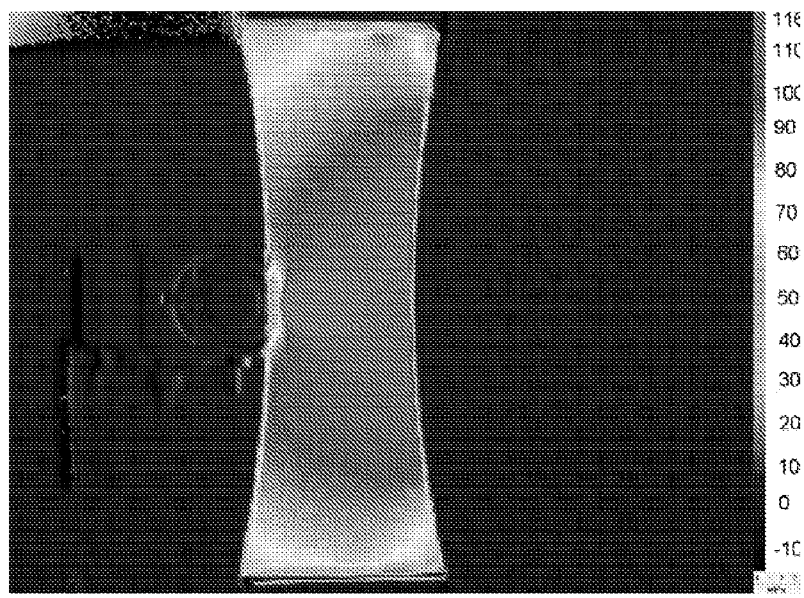
FIG. 11 is an IR thermal image showing stresses in an SPD at 33,000 cycles (units in MPa).

A thin SPD doubler was used so that, in this test program, the damage induced could be evaluated, as the crack opened and closed during fatigue loading, in the interfacial region between the SPD and the 7050-T7451. This damage could have been reduced by increasing the thickness of the SPD thereby lowering the stresses in the underlying 7050-T7451 and subsequently reducing the opening of the crack. The ability of the SPD doubler to pull load from the underlying 7050-T7451 structure is clear from the E-Mode (stress) Lockin thermography picture of the stresses on the specimen side with the SPD patch at 3000 cycles, see FIG. 10. Although the crack in the 7050-T7451 specimen was not immediately evident an analysis of the infra-red data associated with the left hand side of the specimen shown in this picture, i.e. in the SPD directly over the crack, revealed an indication of the crack under the patch. After 33,000 cycles the crack in the 7050-T7451 had grown to a length of approximately 4.2 mm and the resultant stress picture is shown in FIG. 11. At this point there is evidence of delamination damage (disbonding) on the LHS of the SPD in the region that lay over the crack.

Figure 12:
FIG. 12 is an IR thermal image showing stresses in an SPD at 35,500 cycles (units in MPa).
Figure 13:
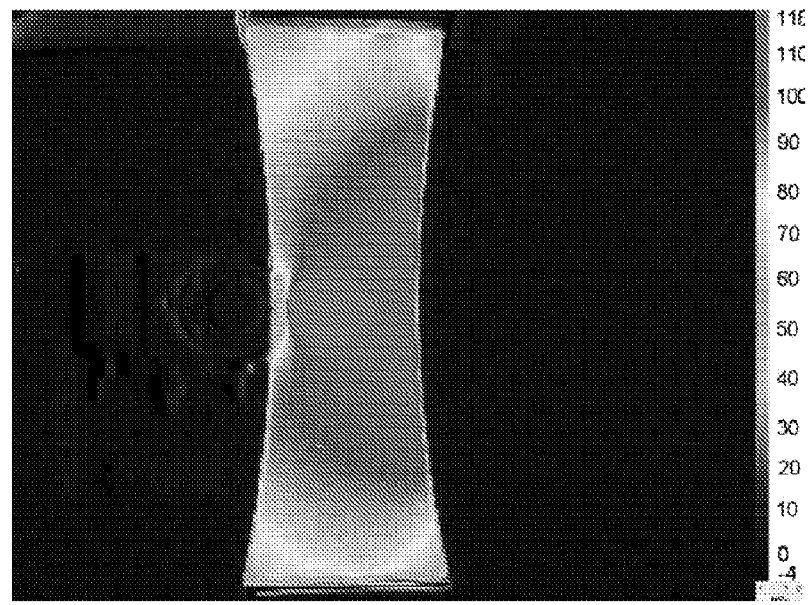
FIG. 13 is an IR thermal image showing dissipated energy at 33,500 cycles (units in MPa).

The extent of the damage is illustrated in FIG. 12 which presents a picture of the dissipated energy at 33,500 cycles. (Note that the dissipated energy associated with the crack tip is clearly evident in this figure. This is important because it raises the potential of non-destructive inspection of the specimen through the SPD doubler.) At 35,500 cycles the crack had grown to approximately 4.92 mm and the associated stress picture is shown in FIG. 13 where it can be seen that the delamination in the SPD has grown slightly.

It would thus appear that whilst damage to the SPD interface can result due to crack opening the onset of damage does not appear to lead to immediate (catastrophic) failure in the SPD. As such damage growth in the SPD can be included in the damage tolerance assessment of the SPD repair process. Furthermore, given that there was no apparent damage at the ends of the SPD the damage in the central region over the crack can be controlled by increasing the thickness of the SPD in this region thereby reducing the stress in the 7050-T7541 together with the associated crack opening displacement.

Figure 14:
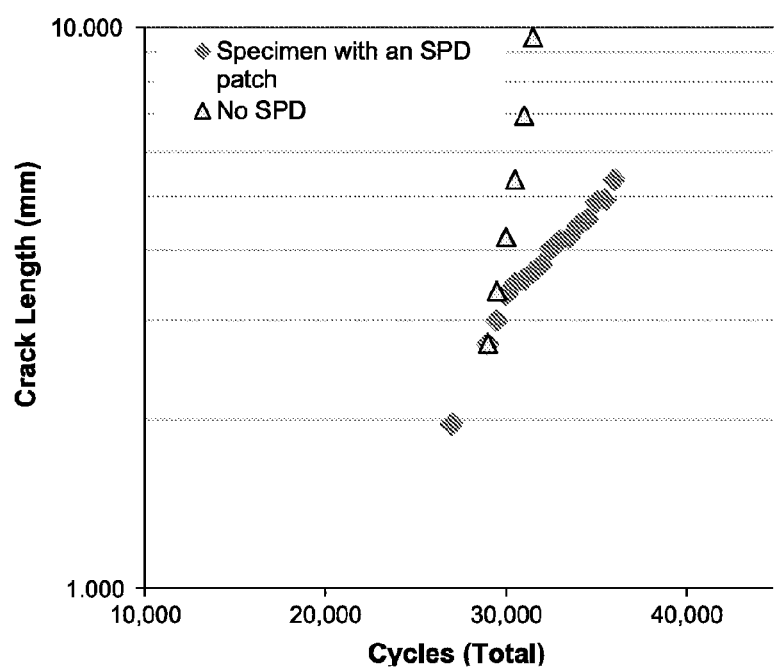
FIG. 14 is a graph showing measured crack length histories with and without an SPD patch.

The test was stopped at 37,000 cycles at which stage the crack was approximately 5.3 mm long. A plot of the measured crack length versus cycles history is presented in FIG. 14 together with test data for the case when there was no SPD. Here it will be noted that the SPD patch has somewhat reduced the crack growth rate. To further confirm the ability of SPD to restore structural integrity and to illustrate the ability to control the onset of delamination damage over the crack a test was subsequently performed on a 1 mm thick 7050-T7451 SENT specimen, with a 0.8 mm long initial edge crack and an in-plane geometry as per the previous test. This specimen had two 0.5 mm thick SPD doublers on either side of the specimen. The specimen was subjected to a peak (remote) load of 5.88 kN with R=0.1 which equates to the same remote stress as in the previous test. In this case the test was stopped after 117,000 cycles as there was no apparent crack growth and no apparent degradation in the SPD.

Example 4: Predicting Crack Growth in the 7050-t7451 Sent Test

This example is directed to prediction of the crack length history seen in the 7050-T7451 SENT test outlined in Section 2.2. Here a 3 mm thick SENT (single edge notch tension) dogbone specimen with a thin 0.5 mm thick 7075 aluminium alloy SPD patch on one side was tested. The specimen was 350 mm long, 42 mm wide and 3 mm thick and had a 0.69 mm radius semi-circular edge notch on one side. The specimen was subjected to a peak (remote) load of 17.64 kN with R=0.1.

The stress intensity factor for a through-the-thickness crack of length c emanating from the centre of the notch of radius r is given in [17] as:

$$K = f_1 g_4 f_w \sigma \sqrt{\pi c} \tag{1}$$

Where c is the length of the crack emanating from the notch and $\sigma$ is the stress in the 7050-T7451 underneath the SPD. The values of $f_1$, $g_4$ and $f_w$ taken from [17] are:

$$f_1 = 1 + 0.358\varphi + 1.425\varphi^2 - 1.578\varphi^3 + 2.156\varphi^4 \tag{2}$$

$$\varphi = 1/(1 + c/r) \tag{3}$$

$$g_4 = K_t(0.36 - 0.32/\sqrt{1+c/r}) \quad (4)$$

$$f_w = 1 + 2.7\varphi - 3.5\varphi^4 + 3.8\varphi^6 \quad (5)$$

$$K_t = 3.17 \quad (6)$$

Figure 15:
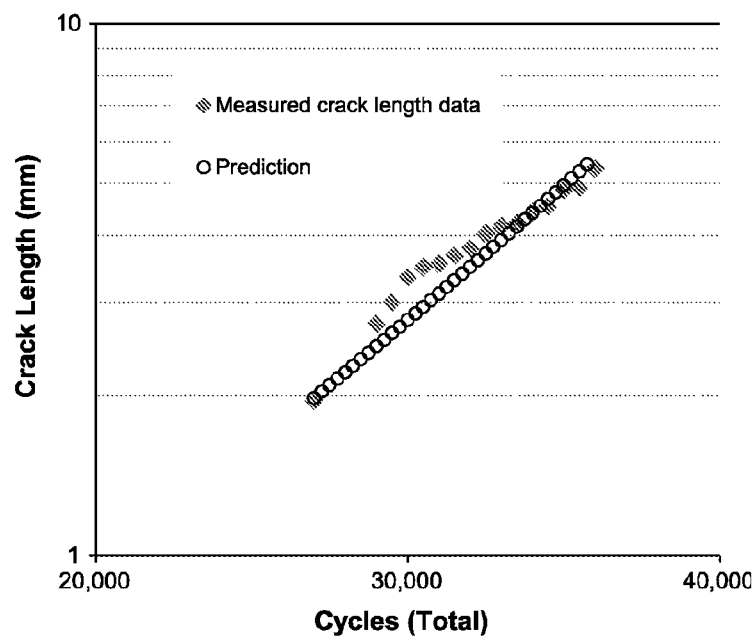
FIG. 15 is a graph showing measured and predicted crack length histories for the SENT specimen with an SPD patch.

Since the specimen was tested using hydraulic grips the formulae used for fw was the fixed displacement expression given in [17]. Let us now attempt to use this solution to predict crack growth. FIG. 11-13 revealed that there was (delamination) damage growth in the SPD over the crack. Thus as recommended in [18] for composite repairs to cracked metal skins the problem was analysed by assuming that the resultant stress intensity factor was equal to the solution to the SENT specimen subjected to a stress field σo which corresponds to the stress in the (base) specimen under the SPD in the absence of a crack. The DSTO Combat and Trainer Aircraft Group [19-21] have shown that the growth of small flaws in 7050-T7451 conforms to the Generalised Frost-Dugdale crack growth law, viz:

$$da/dN = C^* a^{(1-\gamma/2)} (\Delta K^{(1-p)} K_{max} p/\sigma_y)^\gamma / (1 - K_{max}/K_c) \quad (7)$$

where $C^*$, $\gamma$ and $K_c$ are material constants and a, $K_{max}$ and $\Delta K$ are crack lengths, the maximum value of the stress intensity factor at cycle N and the range of the stress intensity factor at cycle N respectively. The crack length history was predicted by integrating Eq. (7) using Eqs. (1)-(8) with $P_{max}$=17.4 kN, R=0.1 and r=0.69 mm. In this calculation the values of $\gamma$, p, $C^*$, $\sigma_y$ to be as given in [19,21], viz: $\gamma$=3, p=0.2, $C^*$=0.50, $\sigma_y$=460 MPa and, for this thickness, $K_c$~50-65 MPa $\sqrt{m}$ were taken. (In this analysis a value of $K_c$=60 MPa $\sqrt{m}$ was used. However, for this range of loads and crack lengths the value has a small effect on the crack length predictions.) The resultant predicted crack length history is shown in FIG. 15 where a good agreement is seen between the measured and predicted crack length histories.

In this case, as for cracks growing under composite repairs [18] the stress intensity factor can be approximated as the solution to the SENT specimen subjected to the stress field cm which corresponds to the stress in the (base) specimen under the SPD in the absence of a crack. One advantage of this approach is that the computed crack length history should be conservative.

Example 5: Approximate Solutions for Centre Cracked Panels Repaired Using SPD

Figure 16:
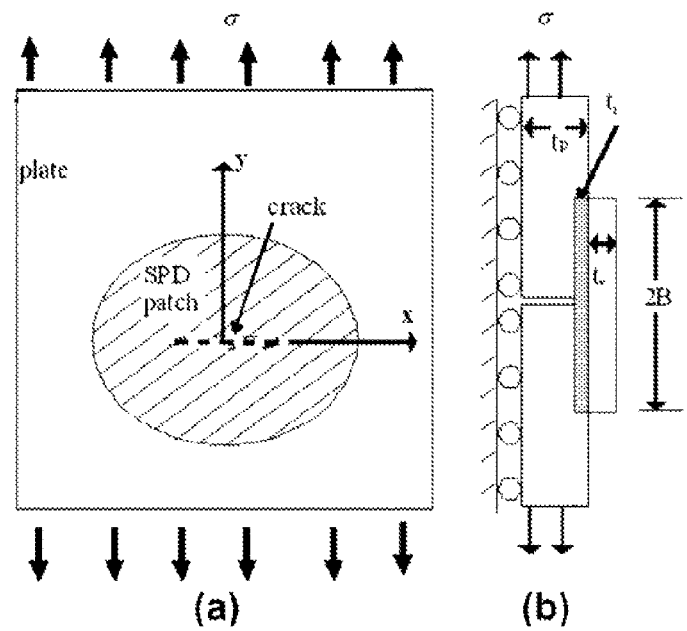
FIG. 16 is a diagram showing repair configuration: (a) plan view, (b) cross-section along centre line, i.e. x=0.
Figure 17:
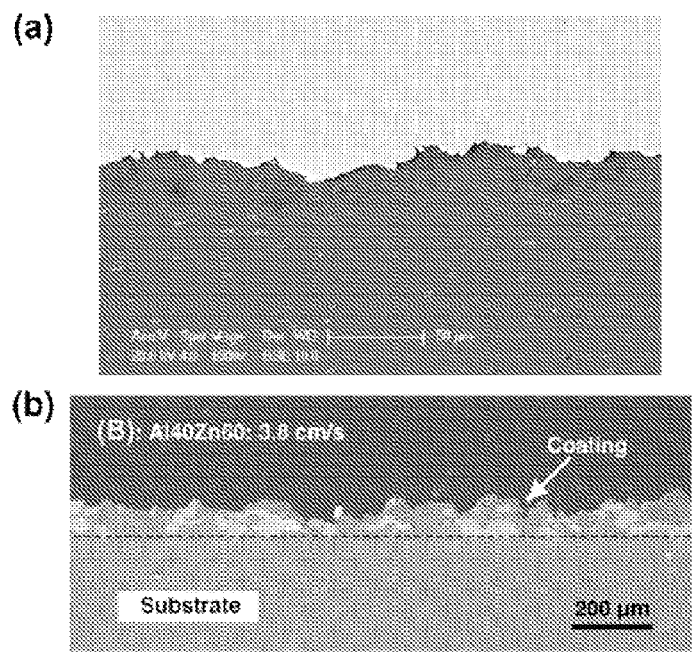
FIG. 17 shows two images of (a) Cu (bright) on an Al substrate, from [22], and (b) AlZn onto an Al substrate, from [23].

In the previous example the case of a thin (0.5 mm) SPD repair to a small flaw in a relatively thick (3 mm) section was considered, and SPD delaminated on either side of the crack was noted. In such cases it was reasonable to assume that the dominant effect of the SPD was to merely reduce the net section stress [18]. However, for certification purposes the solution needed for the stress intensity factor associated with an arbitrary length crack where SPD patch is not thin. It is also necessary to establish if, for a given crack length, the stress intensity factor range $\Delta K$ is beneath the threshold value $\Delta K_{th}$ as this will significantly simplify the certification process. To this end this example will consider an SPD repair of thickness $t_r$ to a centre cracked panel, thickness $t_p$, with an interfacial region, thickness $t_i$, that has been (potentially) affected by the SPD process subjected to a remote stress a as shown in FIG. 16. The SPD process can result in an interfacial region that has been affected by the SPD process [22-24]. For the aluminium alloy powders used in SPD repairs the maximum particle size is approximately 40 μM. Consequently the thickness ($t_i$) of this region is generally very small [22-24] in comparison to the thickness of the underlying plate, i.e. typically less than 0.1-0.15 mm, see FIG. 17. As a result this problem is analogous to that of a bonded repair where the interfacial region mimics the adhesive that joins the repair to the plate. It is known that for small cracks in metal skins repaired using a composite patch the 2D solution for the stress intensity factor is essentially due to the reduction in the stress field under the repair whilst for long cracks the stress intensity factor asymptotes to a limiting stress intensity factor $K_\infty$ as the crack length increases, see [18, 25-28]. As such it follows that the 2D solution for the stress intensity factor associated with small cracks repaired using SPD is also essentially due to the reduction in the stress field under the SPD whilst for long cracks repaired using SPD the stress intensity factor should also asymptote to a limiting stress intensity factor $K_\infty$ as the crack length increases. The approximate formulae for this asymptote thus follows from [26], see pp. 216-218, viz:

$$K_\infty = Y\Omega_L \sigma_0 \sqrt{\pi a} \quad (8)$$

where $$\sigma_0 = \sigma E_p t_p / (E_p t_p + E_r t_r) \quad (9)$$

$\gamma$ is a geometry factor, =1 for a large centre cracked panel and $\Omega_L$ is a load attraction factor that accounts for the different stiffness of the repaired region. ($\Omega_L$=1.) The term $\pi\lambda$ is given by the expression $$\pi\lambda = \sqrt{E_p t_p / \beta (1 + t_p E_p / E_r t_r)} \quad (10)$$

where $$\beta = (t_i/G_i + t_r/3G_r + t_p/3G_p)/(t_i/G_i + 3t_r/8G_r + 3t_p/8G_p)^2 \quad (11)$$

Here $t_i$, $t_p$ and $t_r$ are the thickness' of the interface region where, the SPD has modified the properties of the plate, of the plate, and of the SPD respectively, G and E denote the shear and Young's modulus and the subscripts i, p and r denote their values for the interfacial bonding region, the plate, and the SPD repair respectively. (The notation used in this section follows that given in [26] pp. 217-218.) This expression, i.e. Eq. (11), is an extension of the formulae first developed in [25] in that it allows for the interfacial thickness $t_i$ to be negligible. This (allowance) is important since for SPD repairs the modulii of each region will generally be comparable and the interfacial thickness $t_i$ that is affected by the SPD process is expected to be very small. As such the terms in Eq. (11) related to the term $t_i/G_i$ are small in comparison with those terms relating to the SPD repair ($t_r/3G_r$) and the plate ($t_p/3G_p$). Consequently the expression for $\beta$ can often be approximated as:

$$\beta = (t_r/3G_r + t/3G_p)/(3t_r/8G_r + 3t_p/8G_p)^2 \quad (12)$$

It is expected that, in many instances, the SPD powder, used in the repair, and the plate material will have essentially the same modulii, i.e. aluminium plates are expected to be repaired using aluminium alloy powders and steel components are likely to be repaired using steel powders. In such cases $G_r$ can be approximated by $G_p$ so that Eq. (12) reduces to:

$$\beta = 64 G_p / 27(t_r + t_p) \quad (13)$$

Having established the asymptotic limit it follows from [28-30] that the functional form of K as a function of the crack length (a) can be approximated as:

$$K = W(a/\pi\lambda)\sigma_0\sqrt{(\pi a)} \quad (14)$$

where the function $W$, viz:

$$W(a/(\pi\lambda)) = \sqrt{[(1+2.23a/(\pi\lambda))/(1+3a/(\pi\lambda)+7(a/(\pi\lambda))^2)]} \quad (15)$$

describes the transition from the small crack solution $a\rightarrow 0$ to the long crack solution $a\rightarrow\infty 1$, see [28,30]. Eqs. (14) and (15) reveal that for short cracks the reduction in the stress intensity factor is essentially due to the reduction in the stress in the plate due to the SPD patch, i.e.

$$\lim_{a\to 0} K = \sigma_o \sqrt{\pi}\, a \quad (16)$$

For long cracks K tends to its asymptotic limit L. In Eq. (14) the functional form associated with [30] has been used rather than that given in [28].

Example 6: SPD Repairs to Cracks in an Arbitrary Stress Field

Figure 18:
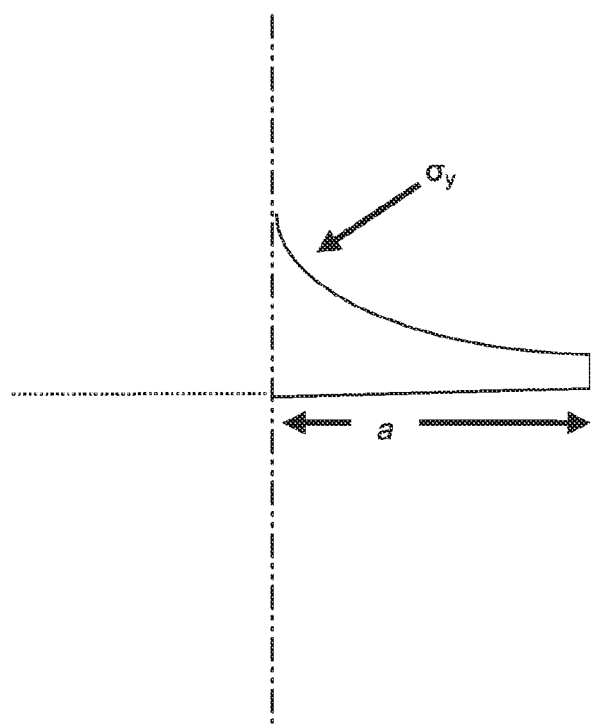
FIG. 18 is a schematic diagram demonstrating the stresses used to determine K.

This example considers the case of an SPD repair to a crack with a total of length 2a subjected to an arbitrary stress field. In this instance the solution for the stress intensity factor K follows from the above analogy with a composite repair to a crack in a metal skin under an arbitrary symmetry stress field [29], viz:

$$K = W(a/\pi\lambda)\bar{K} \quad (17)$$

where $\bar{K}$ is the solution to the entre cracked specimen subjected to a stress $\sigma_o$ which corresponds to the stress in the (base) specimen under the SPD in the absence of a crack is given by $$\bar{K} = 2\sqrt{(a/\pi)}\int_0^a \sigma_y(x)/(a^2-x^2)^{1/2}dx \quad (18)$$

and $\sigma_y$ is the stress in the skin under the SPD in the absence of a crack, see FIG. 18.

Figure 19:
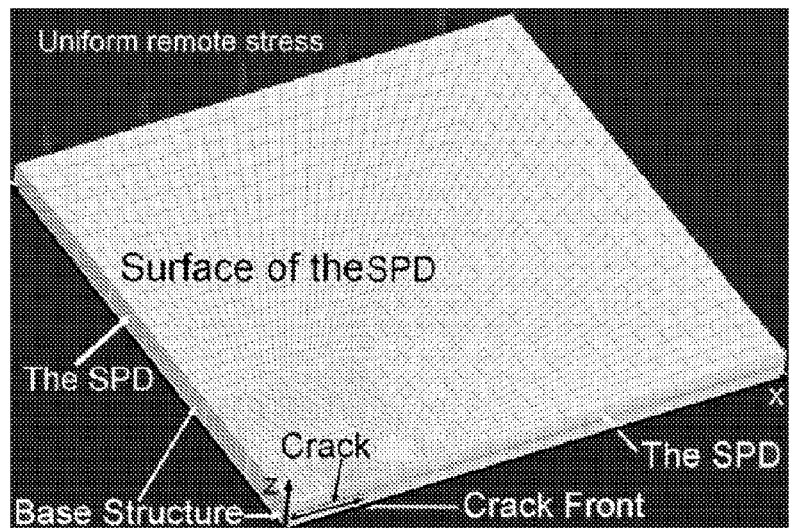
FIG. 19 is a diagram of a typical finite element mesh of the cracked structure and the associated SPD repair. The crack in the base structure (plate) is shown in a different colour to the SPD and the remainder of the cracked plate.

To evaluate the accuracy of this approximation let us consider a 3 mm thick 200 mm 200 mm centre cracked plate repaired using a 3 mm (thick) 200 mm 200 mm SPD patch subjected to a remote uniform stress (in the skin) of 100 MPa. To this end three dimensional finite element models were constructed for: 2, 6, 10, 20, 30, and 40 mm long cracks. Due to symmetry considerations only one quarter of the structure needed to be modelled. In each case the models had approximately 66,000 three dimensional twenty-one nodded isoparametric brick elements and approximately 300,000 nodes, see FIG. 19. There were eight elements through the thickness of the SPD and eight elements through the thickness of the plate. In each case there were ten elements along the crack and the side length of the crack tip elements were approximately 1/100th of the length of the crack. The midside nodes associated with the near tip elements were moved to the quarter points so as to simulate the necessary $r^{-1/2}$ singularity. Bending of the SPD and the plate was prohibited. Both the aluminium alloy plate and the SPD were assumed to have a Young's modulus E=70,000 MPa and a Poisson's ratio of 0.3. The computed values of the maximum value of the stress intensity factor $K_{max}$ are given in Table 1 below along with the associated analytical values, where Eq. (12) was used to compute β, and the quantity.

TABLE 1

Comparison between predicted and computed stress intensity factors.

| α (mm) | Finite element $K_{max}$ (MPa √m) | Analytical $K_{max}$ (MPa √m) | Upper bound $K_\alpha$ (MPa √m) |
|---|---|---|---|
| 1 | 4.88 | 5.03 | 5.60 |
| 3 | 6.77 | 6.82 | 9.71 |
| 5 | 7.29 | 7.29 | 12.53 |
| 10 | 7.56 | 7.59 | 17.72 |
| 15 | 7.60 | 7.65 | 21.71 |
| 20 | 7.60 | 7.68 | 25.07 |

$K_u = \sigma_o\sqrt{(\pi\alpha)}$ $$K_a = \sigma_0\sqrt{(\pi a)} \quad (19)$$

which represents an upper bound on K. Here it can be seen that the stress intensity factor associated with SPD repairs does indeed asymptote to a constant value and that this asymptote is in good agreement with the analytical approximation, i.e. Eq. (14).

Example 7: Quality Control Assessment Tool

When performing composite repairs to aircraft structural members it is common practice to make travelling specimens that are subsequently used to assess the quality of the repair [11,12]. The challenge is to develop a similar approach for SPD modifications/repairs to aircraft structural components. As such this section raises the possibility of using simple specimens that are subsequently fatigue tested and the quality of the bond assessed via the fractal dimension [31] of the resultant fatigue surfaces. In it this context it should be noted that is now known that fracture surfaces can be considered as a fractal set, see Mandelbrot et al. [31]. In this work Mandelbrot et al. [31] wrote: "When a piece of metal is fractured either by tensile or impact loading the fracture surface that is formed is rough and irregular. Its shape is affected by the metal's microstructure (such as grains, inclusions, and precipitates where characteristic length is large relative to the atomic scale), as well as by 'macrostructural' influences (such as the size, the shape of the specimen, and the notch from which the fracture begins). However, repeated observation at various magnifications also reveal a variety of additional structures that fall between 'micro' and 'macro' and have not yet been described satisfactorily in a systematic manner. The experiments reported here reveal the existence of broad and clearly distinct zone of intermediate scales in which the fracture is modelled very well by a fractal surface." It is also known [32-34] that, prior to the onset of rapid fracture, fatigue crack surfaces in metals, that are not associated with very small crack lengths, have a fractal box dimension D, as defined in [32], that lies between approximately 1.2 and 1. Thus it may be possible to use this observation to quantify the quality of the SPD process. To do this travelling specimens would be fabricated in parallel with the SPD application. These travelling specimens would subsequently be fatigue tested and the associated fractal box dimensions measured. It is hypothesised that if D had a value that was near 1.2, or lower, then you would have a process that produced a fatigue crack surface that was consistent with that associated with fatigue crack growth in the base material, and the process would be acceptable. If it was significantly greater then it is hypothesised that the application process may be deficient.

Figure 20:
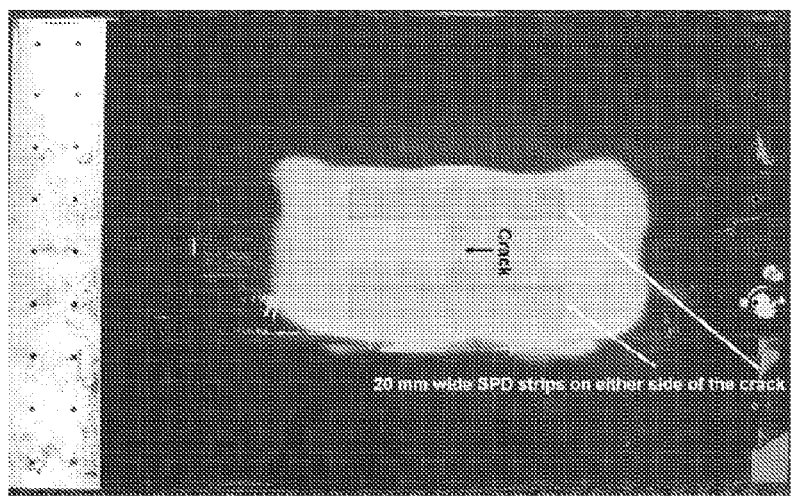
FIG. 20 is a photograph showing two SPD strips on either side of a 20 mm long central crack in a rib stiffened panel.

To evaluate this concept the fractal box dimension was measured, the fractal box associated with SPD doublers used on a rib stiffened panel deposited using powders where there was (subsequently) found to be a quality control issue with the powder, i.e. it was found to contain a large proportion of sub 10 micron particles. In this instance the panels had two ten mm wide and 200 mm long SPD doublers located on either side of a centrally located 20 mm long crack, see FIG. 20.

Figure 21:
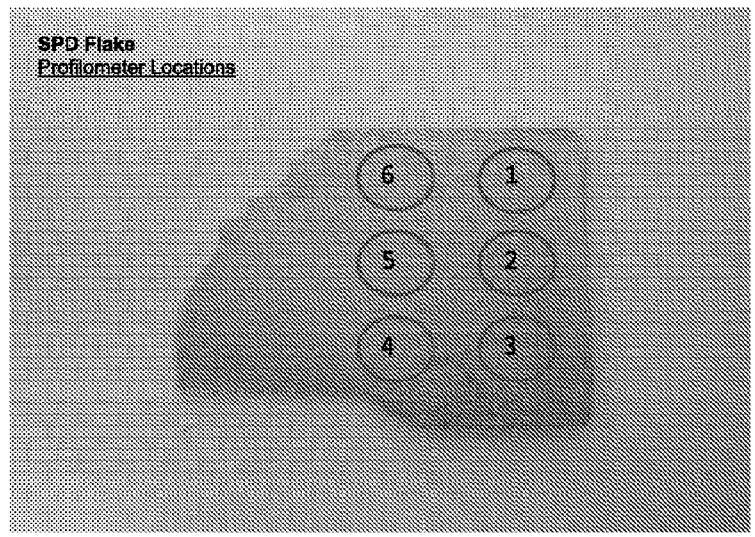
FIG. 21 is a photograph of a delaminated surface of an SPD strip (A), which was 20 mm wide, showing locations where the fractal dimensions were measured.
Figure 22:
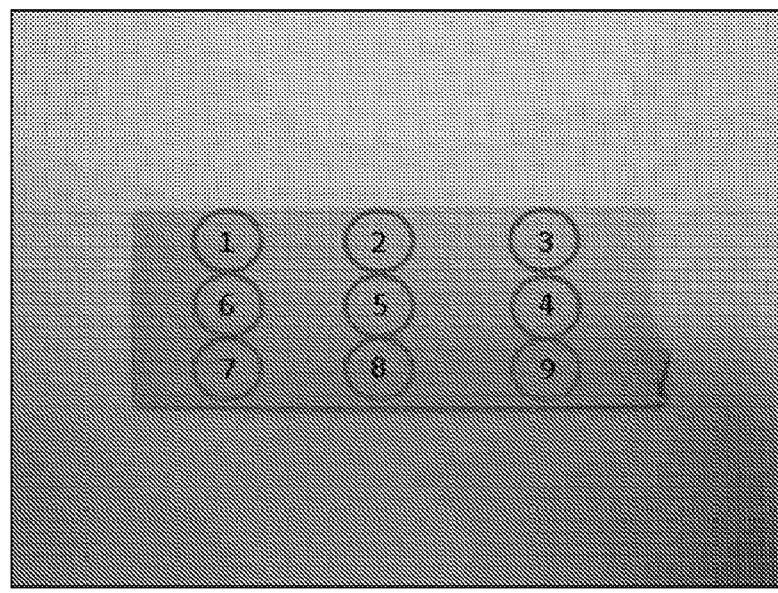
FIG. 22 is a photograph of a delaminated surface of an SPD strip (B), which was 20 mm wide, showing locations where the fractal dimensions were measured.

As a result of the poor quality powder one end of each of the two SPD strips delaminated with the locus of the delaminations lying entirely within the SPD, see FIGS. 21 and 22. The fractal box dimensions associated with delamination surfaces on each of the two SPD strips, referred to in FIGS. 21 and 22 as strips A and B, that delaminated from the structure were measured and the resultant values are given in Tables 2 and 3, below.

TABLE 2

Fractal box dimension (D) associated with the end of strip A.

|  | Random area 1 within location | Random area 2 within location |
| --- | --- | --- |
| Loc 1 | 1.629 | 1.500 |
| Loc 2 | 1.409 | 1.675 |
| Loc 3 | 1.542 | 1.684 |
| Loc 4 | 1.416 | 1.473 |
| Loc 5 | 1.543 | 1.530 |
| Loc 6 | 1.399 | 1.529 |
| Average | 1.49 | 1.57 |

TABLE 3

Fractal box dimension (D) associated with the end of strip B.

|  | Random area 1 within location | Random area 2 within location |
| --- | --- | --- |
| Loc 1 | 1.673 | 1.613 |
| Loc 2 | 1.482 | 1.521 |
| Loc 3 | 1.525 | 1.614 |
| Loc 4 | 1.551 | 1.49 |
| Loc 5 | 1.526 | 1.516 |
| Loc 6 | 1.558 | 1.561 |
| Loc 7 | 1.578 | 1.482 |
| Loc 8 | 1.503 | 1.593 |
| Loc 9 | 1.584 | 1.563 |
| Average | 1.553 | 1.550 |

Here it will be noted that in each case the fractal box dimension D was essentially constant at each of the locations measured on each of the two delaminated strips. Furthermore, the value of the fractal box dimension D was approximately 1.5, see Tables 2 and 3. As such the fractal box dimension D associated with these two poor quality SPD's differed significantly from that associated with macro-scopic fatigue crack growth in metals. Thus whilst a great deal more work is needed to validate the hypothesis that D can be used to quantify the quality of the SPD it looks to be worthy of further evaluation. It is interesting to note that prior to these tests a value of D=1.5 had only (previously) been found for very small fatigue cracks [32,34]. A more detailed discussion of the role of the fractal dimension D in describing the nature of the crack tip singularity and in characterising fatigue crack growth is given in [20, 34-37].

Example 8: Application of SPD to an Aircraft Lap Joint

Specimens have been prepared to evaluate the application of the SPD on a representative aircraft lap.

Figure 24:
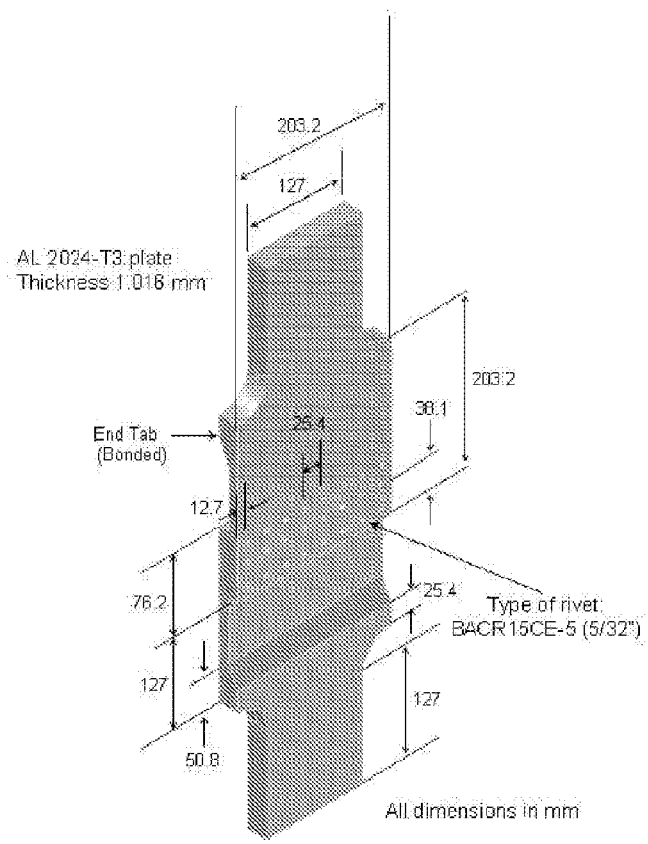
FIG. 24 is a schematic diagram of a fuselage lap joint specimen, without an SPD doubler.

The specimen geometry was developed as part of the FAA Aging Aircraft Program, where it was shown to reproduce the crack length history seen in Boeing 727 and 737 fleet data The basic specimen used consists of two 2024-T3 clad aluminium alloy sheets 1.016 mm 0.04 inch) thick, fastened with three rows of BACR15CE-5, 1000 shear head countersunk rivets, 3.968 mm (5/32 inch) diameter (FIG. 24). The width of the specimen was chosen to coincide with the typical distance between tear straps of a B-737 aircraft. Since the amount of out-of-plane bending in a typical fuselage joint is an important factor in the fatigue performance of the joint, the amount of local bending in the specimen was made similar to that seen in a typical fuselage joint by testing the specimens bonded back-to-back and separated by a 25 mm thick honeycomb core. This test configuration was crucial in ensuring that the specimens reproduced fleet behaviour, see [40, 41]. As in [40, 41] the upper row of rivet holes contained crack initiation sites, induced prior to assembly of the joint by means of an electrical spark erosion technique, on either side of the rivet holes. These initial cracks were (each) nominally 1.25 mm long. This crack length was chosen so that the (initial) defect was obscured by the fastener head and as such was representative of largest possible undetectable flaw size.

Figure 25:
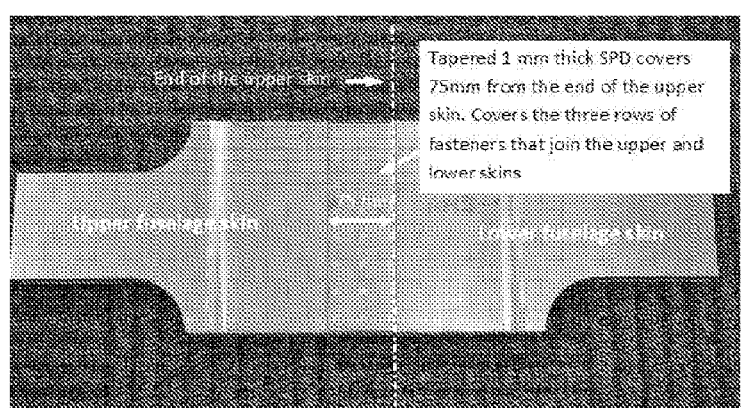
FIG. 25 is a photograph of a lap joint detailing the SPD application specification, showing the region of application. It will be noted that the SPD doubler is applied only up to the edge of the upper fuselage skin, and does not extend onto the lower fuselage skin.

A 1 mm thick 7075 SPD doubler was deposited over the three rows of fasteners, (FIG. 25). The Powder was deposited utilising the Kinetics 4000 Series CGT equipment with the Type 33 polycarbonate nozzle. The surface was pre-cleaned utilising 120 Aluminium Oxide grit at 60 psi. The deposition parameters were as follows:

Elapsed Time Between Surface Prep And Coating: 15-20 mins
Main Gas Pressure (Bar): 40
P/F Vessel Pressure (Bar): 38
Temperature (° C.): 400
P/F Hopper Heater: Active
Main Gas Flow (m3/hr): 92-100
P/F Gas Quantity (m3/h): 6.5
Powder Feed Rate (RPM): 2.7 rpm
Release Temp (° C.): 300
Preheat Temp (° C.): 350
Increment (mm): −0.25 mm
Traverse Rate (mm/s): 250 mm/s
Stand Off (mm): 40 mm (where possible)
Number Of Layers: 12-16 Passes per Patch
Deposition Thickness: 0.005-0.012"
Post Treatment: None Example 9: Testing of SPD Applied to Aircraft Lap Joint The specimens were tested under constant amplitude loading, with the maximum and minimum loads as detailed below.

P Max (kN): 40
PMin (kN) 2
P Mean (kN) 21
Test Frequency (hZ) 5

Figure 26:
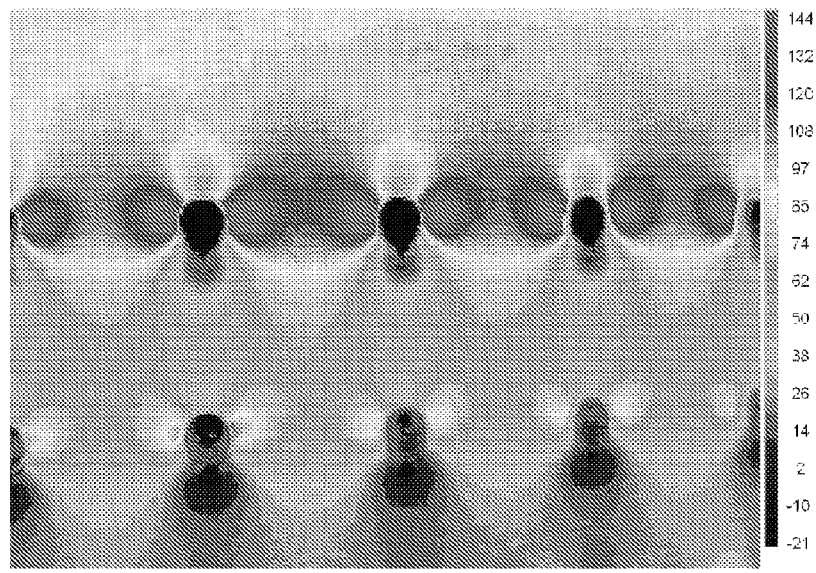
FIG. 26 is an IR thermal image showing stresses, in MPa, at the critical rows of fasteners in a baseline specimen.
Figure 27:
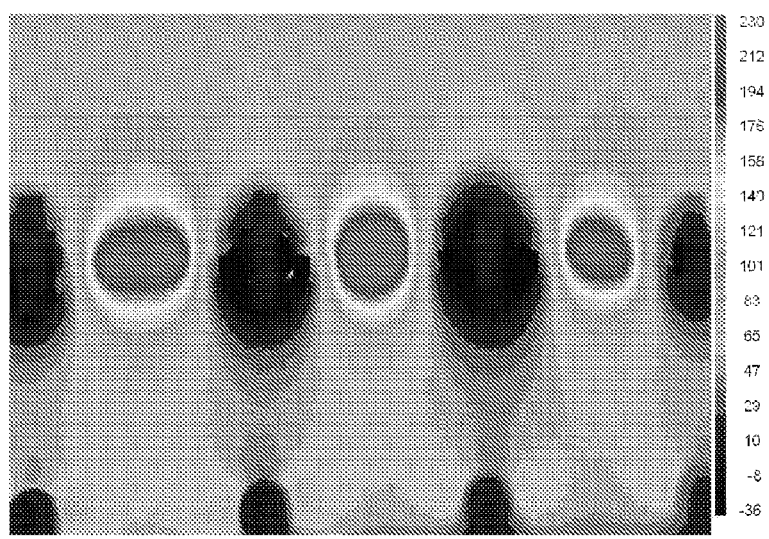
FIG. 27 is an IR thermal image showing stresses, in MPa, prior to link up.

These loads were determined from operational data obtained for the US DoT MSD Committee Review Board for the B-737 aircraft, see [40] for more details, and a stress picture showing the stresses in the baseline specimens is presented in FIG. 26 and a stress picture just prior to link up of MSD is shown in FIG. 27. The fatigue performance of the baseline (no SPD) specimens is documented in [42].

Figure 28:
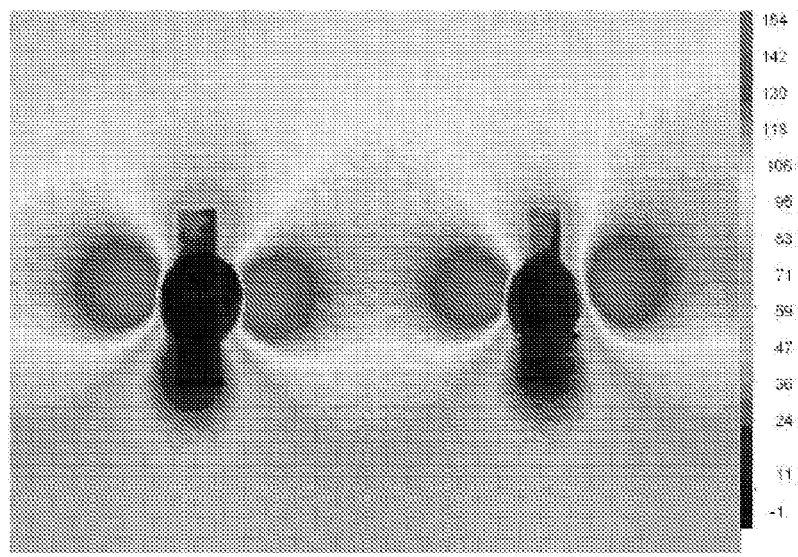
FIG. 28 is an IR thermal image showing stresses, in MPa, in the joint after approximately 6,500 cycles (Baseline No SPD).
Figure 29:
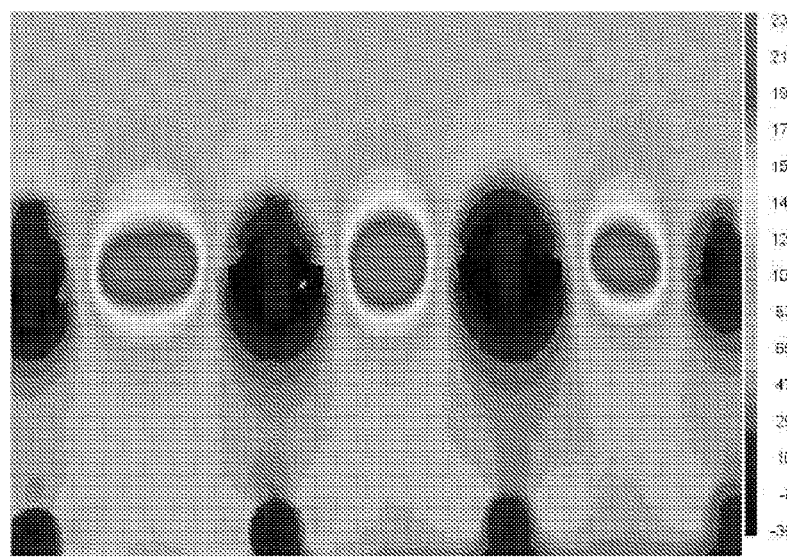
FIG. 29 is an IR thermal image showing stresses, in MPa, at approximately 29,000 cycles (Baseline No SPD).

Here it was found that for specimens without an SPD modification the number of cycles to first link up of cracks from adjacent holes occurs at approximately 30,000 cycles. To illustrate this and to show the stresses in the baseline joint FIGS. 28 and 29 present the stresses in a (baseline) joint at approximately 6,500 and 29,000 cycles respectively.

Figure 30:
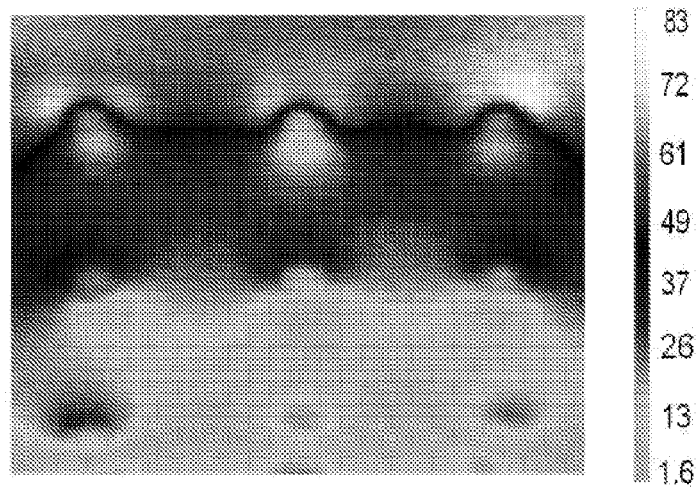
FIG. 30 is an IR thermal image showing stresses in the SPD over the fasteners at 92,000 cycles (Test Panel 1).

For Test Panel 1 the test program revealed that after approximately 110,000 cycles the SPD doubler was still intact. Furthermore, there was no apparent crack growth at any of the fasteners in the lap joint, cracking in the SPD or damage to the bond between the SPD and the skin/fasteners. This is evident from FIG. 30 where we show a close up view of the stresses in three rows of rivets at 92,000 cycles.

Figure 31:
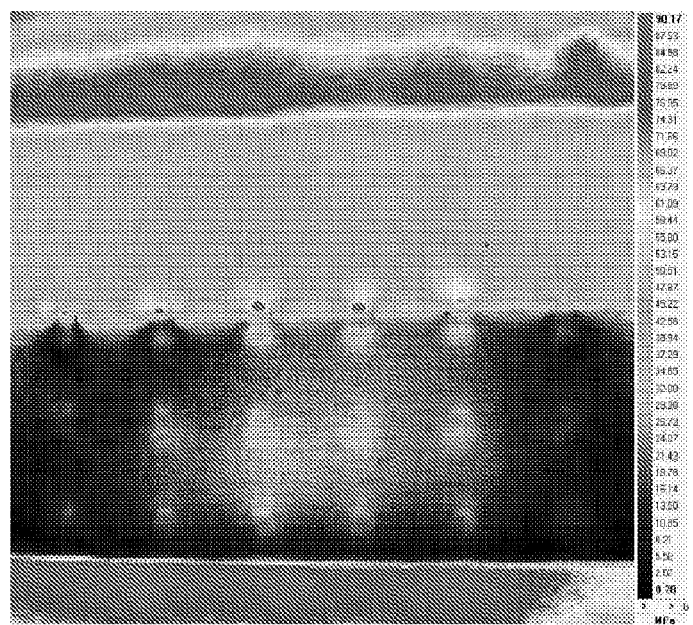
FIG. 31 is an IR thermal image showing stresses, in MPa, in the lap joint specimen at 18,000 cycles (Test Panel 2).
Figure 32:
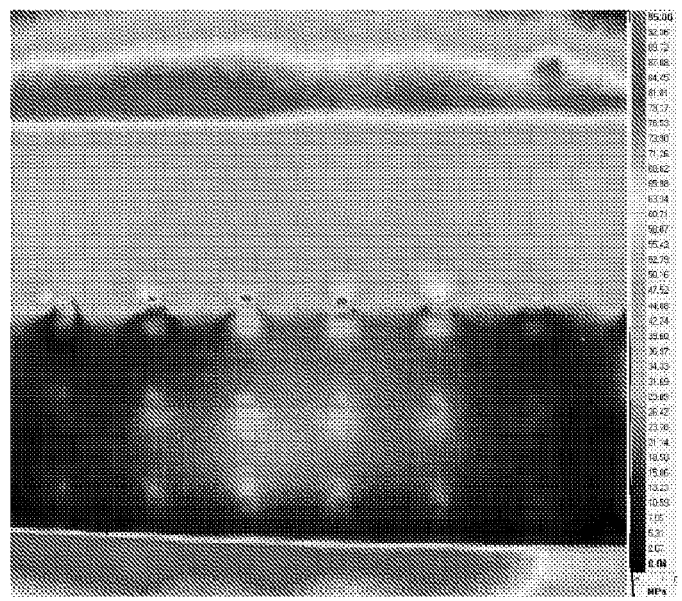
FIG. 32 is an IR thermal image showing stresses, in MPa, in the lap joint specimen at 48,000 cycles (Test Panel 2).

The test results revealed that the SPD doubler significantly reduces the stresses in the joint. This means that the SPD seals the fasteners and continues to do so for more than 110,000 cycles. This represents a factor more than 3.6 in the Limit of Viability (LOV) [12] of the joint. Test Panel 2 also achieved 2 times the LOV (60,000 cycles) even though there were pre existing delaminations between the skins (both upper and lower) and the honeycomb core (i.e. loss of panel stability) prior to test. FIGS. 31 and 32 present the stress distribution in the SPD Test Panel 2 at 18,000 cycles and 48,000 cycles respectively. Comparing FIGS. 26 and 31 a significant reduction in the stresses in the joint is noted. In the upper section of the picture 31, an increase in the stresses in the skin at the edge of the SPD where load is being attracted up from the skin into the SPD. The stress concentrations in the SPD over each of the fasteners are also visible.

From this Example it can be seen that the SPD has remained intact, thereby ensuring that the joint is sealed. Although this study has focused on fuselage lap joints the ability of an SPD doubler to form a durable bond to both the skin and the fasteners predicts that this approach may well be applicable to other problem areas in an aircraft.

Example 10: Repairs to Corrosion Reworks in Fuselage Lap Joints

Figure 33A:
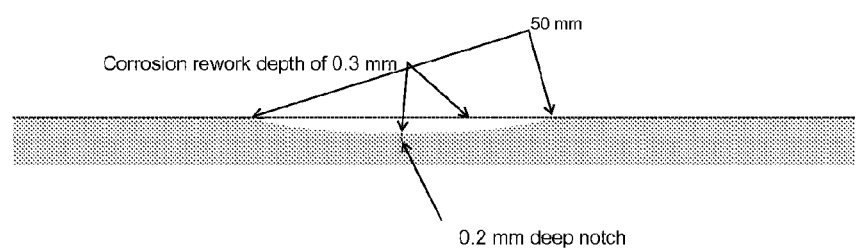
FIG. 33 is a diagram of a corrosion rework repair in cross section. Panel "a" shows the area before repair, while Panel "b" shows the same area after repair with SPD.
Figure 33B:
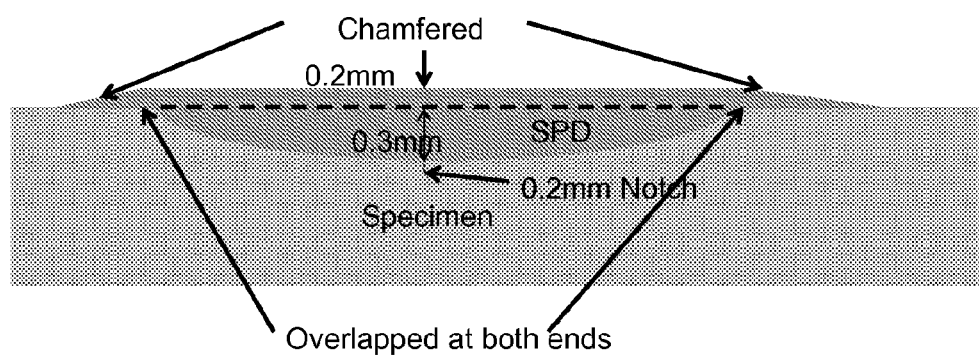

The Background section herein describes the difficulties and shortcomings in repairing corrosion in aircraft fuselages. Applicant proposes the use of SPD to repair corrosion damage as an alternative to prior art methods. To validate this approach 2 mm thick, 400 mm long and 42 mm wide 7075-T6 aluminium alloy specimens were tested. Each specimen contained a 0.3 mm deep by 50 mm long by 42 mm wide corrosion cutout, also commonly referred to as a corrosion blendout (see FIG. 33a). To simulate a small corrosion pit that was not removed by the corrosion blendout the specimens each contained a small 0.2 mm deep notch that ran the full width of the specimen. Several specimens were repaired using SPD, particularly the centre section of specimen with 10 mm natural taper (Lateral ends).
SPD Equipment
  Manufacturer: CGT//ABB; SPD TYPE (System): K8000
  Nozzle Type: Polycarbonate w/Cooling
Specimen Preparation
  No preparation required.
Coating Powder
  Powder Material: 7075 Al.
  Powder Supplier: MSSA
  Material/Lot: 07-8015S POWDER SIZE (μm): −325 Mesh [<60μ]
  Powder Pre-Treatment: Screened through. 100μ>75μ>62>
Coating Data
  Elapsed Time Between Surface Prep And Coating: N/A
  Main Gas Pressure (Bar): 40
  P/F Vessel Pressure (Bar): 38
  Temperature (° C.): 415
  P/F Hopper Heater: Active
  Main Gas Flow (m3/hr): 98-108
  P/F Gas Quantity (m3/h): 3.5
  Powder Feed Rate (RPM): 2.7 rpm
  Release Temp (° C.): 315
  Preheat Temp (° C.): 350
  Increment (mm): −0.50 mm
  Traverse Rate (mm/s): 500 mm/s
  Stand Off (mm): 40 mm
  Deposition Thickness: 0.5 mm A crossection of the geometry of the repaired specimens is shown in FIG. 33b.

The unrepaired specimen was subjected to constant amplitude tests at a peak stress of 140 MPa whilst SPD repaired specimens were tested at both 140 and 160 MPa.

The baseline specimens, i.e. without an SPD repair, when tested at 140 MPa lasted approximately 36,800 cycles. This contrasts with in excess of 15,000,000 cycles for the SPD repaired specimen when tested at the same (i.e. 140 MPa) stress level. (The SPD repaired specimen did not fail and there was no evidence of cracking in the SPD or in the baseline specimen. Hence the test was stopped after 15,000,000 cycles.). Two SPD repaired specimens were subsequently tested at 160 MPa. These specimens failed at approximately 640,000 cycles and 1,330,000 cycles respectively due to small initial defects induced during removal of the surface material when attempting to simulate a corrosion blendout. In all cases the fatigue lives of the SPD repaired specimens were dramatically greater than that seen for the baseline corrosion blendout specimens.

It has also been shown that SPD can be used to repair corrosion damage and that the resultant repaired structure has a dramatically increased fatigue life. It is now possible to repair corrosion damage without the need to introduce new holes, which act as potential sites for both corrosion and cracking, and without the need to parasitically stiffen (i.e. locally over stiffen) the structure and thereby change the load paths as a result of increasing the local stiffness of the region as a result of adding a mechanical patch.

REFERENCES

[1] Efforts to reduce corrosion on the military equipment and infrastructure of the department of defense, Office of the Secretary of Defense, USA. Department of Defense Report; June 2007.

[2] Karthikeyan, J. 2004. Cold spray technology: International status and USA efforts. ASB Industries. 1-14.

[3] Decker M K, Smith M F. Thermal spray and cold spray analysis of density, porosity, and tensile specimens for use with LIGA applications. SAND2000-0339, Sandia National Laboratories; February 2000.

[4] Sartwell B D, Kestler R, Legg K O, Assink W, Nardi A, Schell J. Validation of HVOF WC/Co, WC/CoCr and Tribaloy 800 thermal spray coatings as a replacement for hard chrome plating on C-2/E-2/P-3 and C-130 propeller hub system components, NRL-PP-99-22-FR-01, Naval Research Laboratory, Washington; May 2003.

[5] Sakaki K. Cold spray process overview and application trends. Mater Sci Forum 2004; 449-452:1305-8.

[6] Karthikeyan, J. Development of oxidation resistant coatings on GRCop-84 substrates by cold spray process. NASA-CR 2007-214706; 2007.

[7] Pepi, M. Cold spray technology for repair of magnesium rotorcraft components. NAVAIRa corrosion resistant alloy workshop; 8-9, November 2006.

[8] Villafuerte J. Current and future applications of cold spray technology, Recent trends in cold spray technology: Potential applications for repair of military hardware, NATO RTO-MP-AVT-163; 2010. p. 1-14. <ftp://ftp.rta.nato.int>.

[9] Matthews N. Supersonic particle deposition (SPD) cutting edge technology for corrosion protection and damaged metallic component recover In: Proceedings 2010 SDE symposium program "Design Engineering in a SRP Environment". RAAF Williams, Melbourne, Australia; 24-25, March 2010.

[10] Stoltenhoff T. Praxair surface technologies GmbH, Germany, 8th Colloquium, HVOF spraying cold spray, Conference, Erding, Germany; 2009.

[11] Baker A A, Rose L R F, Jones R. Advances in the bonded composite repair of metallic aircraft structure", vol. I and II, Elsevier Applied Science Publishers; 2002. ISBN 0-08-042699-9.

[12] Baker A A, Jones R. Bonded repair of aircraft structure. The Hague: Martinus Nijhoff Publishers; 1988.

[13] Harwood N, Cummings W H. Thermoelastic stress analysis. Bristol: Adam Hilger; 1991.

[14] Diaz F A, Yates J R, Patterson E A. Some improvements in the analysis of fatigue cracks using thermoelasticity. Int 0.1 Fatigue 2004; 26:365-76.

[15] Jones R, Pitt S. An experimental evaluation of crack face energy dissipation. Int J Fatigue 2007; 28(12):1716-24 (Details on the use of lock-in thermography to measure surface stresses and energy dissipation are given in [13, 14].).

[16] N. S. Iyyer, N. E. Dowling, Fatigue growth and closure of short cracks, AFWoALTR-89-3008; June 1989.

[17] Newman J C, Wu X R, Venneri S L, Li C G. Small-crack effects in high-strength aluminium alloys, NASA, editor. NASA; 1994.

[18] Jones R. A scientific evaluation of the approximate 2D theories for composite repairs to cracked metallic components, Compos Struct 87(2) (2009) 151-160.

[19] Jones R. Molent L. Critical review of the generalised frost-dugdale approach to crack growth in F/A-18 Hornet structural materials, DSTO-RR-0350; March 2010.

[20] Jones R, Molent L, Pitt S. Crack growth from small flaws. Int J Fatigue 2007; 29:658-1667.

[21] Jones R, Barter 5, Chen F. Experimental studies into short crack growth. Eng Fail Anal 2011. doi:10.1016/j.engfailanal.2011.03.012.

[22] Zhao Z B, Gillispie B A, Smith J R. Coating deposition by the kinetic spray process. Surf Coat Technol 2006; 200:4746-54.

[23] Hussain T, McCartney D G, Shipway P H, Zhang D. Bonding mechanisms in cold spraying: the contributions of metallurgical and mechanical components. J Therm Spray Tech 2008; 18(3):364-79.

[24] Pepi M, Cold spray technology for repair of magnesium rotor craft components. In: Proceedings NAVAIR corrosion resistant alloy workshop, 8-9, November 2006.

[25] Rose L R F. A cracked plate repaired with bonded reinforcements. Int J Fract 1982; 18:135-44.

[26] Jones R. Numerical analysis and design. In: Baker A, Rose L R F, Jones R, editors. Advances in the bonded composite repair of metallic aircraft structure. Elsevier Applied Science Publishers; 2002. ISBN: 0-08-042699-9.

[27] Jones R. Crack patching: design aspects. In: Baker A, Jones R, editors. Bonded Repair of Aircraft Structure. The Hague: Martinus Nijhoff Publishers; 1988 [chapter 9].

[28] Wang C H, Rose. A crack bridging model for bonded plates subjected to tension and bending. Int J Solids Struct 1999; 36:1985-2014.

[29] Jones R, Chiu W K, Marshall I H. Weight functions for composite repairs to rib stiffened panels. Eng Fail Anal 2004; 11(1):49-78.

[30] Hart-Smith U. Recent expansions in the capabilities of Rose's closed-form analyses for bonded crack-patching. In: Baker A, Rose L R F, Jones R, editors. Elsevier Applied Science Publishers; 2002. ISBN: 0-08-042699-9 [chapter 8].

[31] Mandelbrot B B, Passoja D E, Paullay A J. Fractal character of fracture surfaces of metals. Nature 1984; 308:721-2.

[32] Bouchaud E. Scaling properties of cracks. J Phys Condens Matter 1997; 9:4319-44.

[33] Mandelbrot B B. Fractal analysis and synthesis of fracture surface roughness and related forms of complexity and disorder. Int J Fract 2006; 138:13-7.

[34] Carpinteri A, Paggi M. A unified fractal approach for the interpretation of the anomalous scaling laws in fatigue and comparison with existing models. Int J Fract 2010; 161:41-52.

[35] Spagnoli A. Self-similarity and fractals in the Paris range of fatigue crack growth. Mech Mater 2005; 37:519-29.

[36] Saether E, Ta'asan S. A Hierarchical approach to fracture mechanics, NASA/TM-2004-213499.

[37] Carpinteri An, Spagnoli An, Vantadori S, Viappiani D. Influence of the crack morphology on the fatigue crack growth rate: a continuously-kinked crack model based on fractals. Eng Fract Mech 2008; 75(3-4):579-89.

[38] http://www.dailymail.co.uk/news/article-1374574/Southwest-Airlines-fully-operational-plane-cracks-repaired.html

[39] http://www.bbc.co.uk/news/world-us-canada-12954335

[40] Jones R. and Molent L, Chapter 16, Repair of Multi-site Damage, A. Baker, Advances in the Bonded Composite Repair of Metallic Aircraft Structure, Edited by L. R. F. Rose and Jones R., Elsevier Applied Science Publishers, 2002. ISBN 0-08-042699-9

[41] Jones R. Cairns K., Baker J., Krishnapillai K. And Hinton B., A study of the effect of CPCs on fatigue crack propagation in a representative fuselage lap joint specimen, Engineering Fracture Mechanics, doi: 10.1016/j.engfracmech.2011.11.015.

[42] J. F. Mcquire, 727 design and test verification, Boeing, STRU-B8500-P86, Seattle, 1986.

[43] Anon, 727 fleet data, Boeing, STRU-BY108-P89-01, Seattle, 1989.

The invention claimed is:

1. A method comprising:
   (i) repairing a structural weakness, and/or (ii) preventing or inhibiting progression of a structural weakness in an aircraft structure, the structural weakness arising in a course of service of the aircraft, wherein repairing or preventing or inhibiting progression comprises:
   bonding a plurality of metallic particles to the structural weakness of the aircraft structure arising in the course of service of the aircraft, the bonding being effected under conditions allowing the plurality of metallic particles to form a substantially continuous layer having a depth of at least about 0.2 mm, wherein the aircraft structure is returned to at least a proportion of its original strength.

2. A method according to claim 1 wherein the substantially continuous layer is positioned to prevent ingress of an environmental element into the structural weakness.

3. A method according to claim 1 wherein at least a proportion, or substantially all, of the particles are metallic particles.

4. A method according to claim 1 wherein the bonding does not involve melting or fusing of the particles.

5. A method according claim 1 wherein the bonding is achieved by a cold spray process.

6. A method according to claim 5 wherein the cold spray process is supersonic particle deposition.

7. A method according to claim 1 wherein the substantially continuous layer has substantially even depth across an application surface to which the plurality of metallic particles is bonded.

8. A method according to claim 1 wherein the aircraft structure is a fuselage component.

9. A method according to claim 1 wherein the aircraft structure is a sheet metal.

10. A method according to claim 1 wherein the aircraft structure is a lap joint.

11. A method according to claim 10 wherein the substantially continuous layer does not extend to cover a junction between a free end of a sheet metal component of the lap joint.

12. A method according to claim 1 wherein the structural weakness is a crack.

* * * * *